United States Patent [19]

Baronetti et al.

[11] Patent Number: 5,684,804
[45] Date of Patent: Nov. 4, 1997

[54] DEVICE FOR TRANSMITTING, RECEIVING AND DECODING COMPRESSED AUDIOVISUAL STREAMS

[75] Inventors: Giovanni Baronetti; Stefano Dal Lago; Marco Gandini, all of Turin; Pierangelo Garino, Volpiano; Giovanni Ghigo, Torre Pellice, all of Italy

[73] Assignee: SIP-Societa Italiana per l'Esercizio delle Telecomunicazioni p.a., Turin, Italy

[21] Appl. No.: 556,794

[22] Filed: Nov. 2, 1995

[30] Foreign Application Priority Data

Dec. 23, 1994 [IT] Italy .................... TO94A1068

[51] Int. Cl.$^6$ .................... H04J 3/06; G06F 13/372
[52] U.S. Cl. .................... 370/509; 370/542; 348/423; 395/200.17
[58] Field of Search .................... 370/94.2, 94.1, 370/112, 85.13, 252, 487, 486, 485, 493, 496, 498, 503, 506, 509, 510, 511, 512, 513, 514, 535, 536, 537, 538, 539, 540, 541, 542, 543, 545, 564, 110.1, 100.1; 348/423, 473; 379/105; 395/200.17

[56] References Cited

U.S. PATENT DOCUMENTS

| | | | |
|---|---|---|---|
| 5,448,548 | 9/1995 | Delproch et al. | 370/112 |
| 5,481,563 | 1/1996 | Veltman | 370/94.1 |
| 5,537,148 | 7/1996 | Fujinami | 348/473 |
| 5,559,999 | 9/1996 | Matari et al. | 370/110.1 |

*Primary Examiner*—Melvin Marcelo
*Assistant Examiner*—Huy D. Vu
*Attorney, Agent, or Firm*—Herbert Dubno

[57] ABSTRACT

A device for transmitting and decoding audio-visual streams arranged in accordance with standard ISO/IEC 11172 is provided. The device (DEC) comprises: interfaces (CSC, IA, CIS) for connection to a local storage device (MEL) or to a telecommunications network (2, 3), for receiving streams from remote sources or send streams to remote receivers; demultiplexing and synchronisation means (DES) for splitting the audio-visual streams into constituent audio, video and private data streams and extracting synchronisation information from the streams, and means (DA, DV, UA, UV) for decoding audio and video streams and present audio and video signals in analog form at the output. A controller (CNT) is to control and supervise demultiplexing and decoding operations.

16 Claims, 18 Drawing Sheets

DEVICE FOR TRANSMITTING, RECEIVING AND DECODING COMPRESSED AUDIOVISUAL STREAMS

FIELD OF THE INVENTION

The present invention relates to processing systems for digitized audio and video signals, and in particularly, to a device for receiving, transmitting and decoding compressed audio-visual streams, arranged in accordance with international standard ISO/IEC 11172, also known as ISO/MPEG-1. For the sake of simplicity, such streams shall hereinafter be called MPEG streams or data.

BACKGROUND OF THE INVENTION

As is well known, MPEG streams are time-division streams in which, in addition to sequences of audio and video packets, sequences of packets relating to data of other kinds (hereinafter called "private data") are also multiplexed; the latter data are generated by a user and their nature entirely depends on the user himself. Coding the bit sequence in one of said streams entails two layers: an outside layer ("system layer"), which provides the functions required to use one or more streams of compressed data in a system, and an inside layer ("compression layer") which provides the functions required for coding audio and video data.

A MPEG stream decoder shall thus comprise a system layer decoding part, to split up the streams into their different components (audio, video and data) and recover the information necessary for synchronization between audio and video components; a video decoding part; and an audio decoding part. The functions assigned to the three decoding parts and their requirements are described in detail respectively in parts 1, 2 and 3 of the standard.

Devices for decoding MPEG audio-visual streams are already commercially available. In particular, the device "CL 450 Development Kit" of the C-CUBE company is a device, to be connected to a personal computer, which carries out audio and video decoding functions and also allows overlaying the decoded video signal to the output signal of a video-graphic board, so as to allow the presentation of the video signal in a window of a graphic application. The functions prescribed by the system layer of the algorithm are assigned to a separate program, run by the computer processing unit.

The device has some drawbacks due to this division of tasks between the device itself and the host personal computer.

A first drawback is that the device itself cannot be used as an autonomous device, as it lacks essential functions such as synchronization. Furthermore, the fact that certain functions are assigned to the computer processing unit slows down the computer operations and penalizes its performance, if it has to carry out other operations. Moreover, software management of synchronization functions is complex and the results obtained are not excellent.

The known device is also not very flexible, since it cannot be connected directly to different sources, but rather requires, for this purpose, external interface boards to be associated to the controller. Aside from the difficulty in finding these boards on the market, their use would require the engagement of the computer bus, and this would take away resources from other tasks.

SUMMARY OF THE INVENTION

According to the invention, instead, a device is provided which can be used both as an autonomous device, since it is equipped with the means to carry out the functions required by the system layer, and as an expansion of a conventional personal computer, and which is equipped with circuits for direct connection to different external data sources. Furthermore, when it is used in association with a computer, the device can carry out decoding functions and can be connected with external sources without subtracting processing resources from the computer itself.

A device for transmitting, receiving and decoding audio-visual streams (hereinafter referred to as MPEG streams) organized in accordance with standard ISO/IEC 11172 and resulting from the multiplexing of coded audio and video streams as well as of user-depending data streams, i.e. private data, comprises demultiplexing and synchronization means for demultiplexing the MPEG streams into the constituent audio, video and private data streams and for extracting synchronization information from the MPEG streams, means for decoding audio and video streams, means for the presentation of audio and video signals in analog form, and associated with a controller controlling and supervising the demultiplexing and decoding operations.

The device is formed as a board embodying the demultiplexing and synchronization means, which are a unit distinct from the controller, and comprises first interface means for connection to a local storage device which constitutes a local source or a local receiver of said MPEG streams, and second interface means for connection to a telecommunications network through which the device receives the MPEG streams from remote sources or transmits them to remote receivers. The board can constitute an expansion of a personal computer which has the controller and which is also entrusted with programming the interface means and the demultiplexing and synchronization means, the decoding means and the presentation means. The demultiplexing and synchronization means operates without engaging the processing unit of the controller. The board can also incorporate the controller to form a preprogrammed autonomous decoding device.

The device can include temporary storage means, functionally subdivided into four sections, the first of which is intended for memorization of the MPEG streams to be demultiplexed and decoded and the other three sections of which serve for the memorization of the demultiplexed audio, video and data streams, respectively.

The second interface means can comprise means for connection to a first serial line, intended for asynchronous transmission of MPEG streams, and means for connection to a second serial line intended for synchronous transmission of MPEG streams, data and commands (messages) which cannot be inserted in the MPEG streams and which are directed to the controller, and signals acknowledging that a message has been received or an operation has been carried out.

The device can also comprise an input bus to which the first interface means, the means for connection to the first serial line, the controller and the demultiplexing and synchronization means are connected, and which allows: transfer of MPEG streams from the first interface means and from the means for connection to the first serial line to the demultiplexing and synchronization means and vice versa; forwarding the private data extracted from the MPEG streams to the controller; forwarding messages and acknowledge signals from the demultiplexing and synchronization means to the controller and vice versa; and access of the controller to the first and the second interface means and to the demultiplexing and synchronization means to write programming information and read information on the operation of the device.

An output bus can be provided to which the demultiplexing and synchronization means, the means for decoding audio and video streams and the controller are connected and which allows the transfer from the demultiplexing and synchronization means to the decoding means of the demultiplexed audio and video streams, and the access by the controller to the decoding and presentation means for their programming.

The means for connection to the second serial line can be connected directly to the demultiplexing and synchronization means through a third serial line.

The demultiplexing and synchronization means can comprise:

third interface means for transferring from the input bus to the temporary storage means and vice versa, with a direct memory access technique, MPEG streams coming from or directed to the first interface means, the means for connection to the first serial line or the controller;

fourth interface means for transferring demultiplexed audio and video streams from the temporary storage means to the output bus;

fifth interface means for managing the signal exchange, through the third serial line, between the means for connection to the second serial line and the demultiplexing and synchronization means;

a parser, which receives the MPEG streams from the temporary storage means, demultiplexes them and extracts therefrom synchronization information, comprising at least information representative of a base frequency for the local reconstruction of a clock signal at that base frequency;

control means for the temporary storage means;

sixth interface means for information exchange with the controller and which makes information on the device operation available to the controller, supplies commands to the other circuits of the demultiplexing and synchronization means and has arbitration tasks to prevent conflicts for the access to the input bus by the demultiplexing and synchronization means or by the controller; and synchronization means for the local reconstruction of the base frequency clock signal and for generating a timing signal which determines the reading frequency by the parser in the first section of the temporary storage means.

The parser can include a receiving unit for receiving data from the first section of the temporary storage means, and which requests the data with a frequency determined by the timing signal;

means, connected to an output of the receiving unit, for transferring, to the fifth interface means information to be forwarded to the second serial line;

first decoding means also connected to the output of the receiving unit for recognizing and decoding codes representative of service information inserted in the MPEG streams in order to allow their demultiplexing, communication information extracted from said codes to a control unit or to a parameter memory, depending on the type of information and extracting and sending to the synchronization means the information representative of a base frequency;

second decoding means for recognizing and separating packets relevant to the video, audio and private data streams multiplexed in the MPEG streams, supplying the packets to respective output ports for subsequent forwarding respectively to the second, third and fourth section of the temporary storage means; and supplying service information extracted from a header of each packet to the parameter memory, the first and second decoding means also communication anomalous situations detected to the control unit;

said parameter memory, which is also accessible by the controller to write programming information and reading information extracted from the MPEG streams, and which controls the second decoding means so as to enable the extraction of a sequence of packets relevant to one or more predetermined streams of the different types; and the control unit, which is arranged to start the operations of the parser when receiving a start signal from the controller, and to enable, on the basis of the information recognized by the first decoding means themselves and of the information contained in the parameter memory, either the units belonging to the first decoding means and intended to recognize specific codes, or the second decoding means.

The parser also can comprise means, controlled by said control unit and connected between the output of the receiving means and the output ports for the audio and video streams, for transferring the packets of a MPEG stream directly from the receiving means to one of such output ports, so that such packets bypass the second decoding means.

The temporary storage means can be made up of a dynamic random access memory. The control means are able to serve access requests, coming from the demultiplexing and synchronization means, for writing MPEG streams to be demultiplexed or reading demultiplexed audio, video and data streams into or respectively from one of the sections of the temporary storage means, and access requests coming from the controller for writing/reading information relevant to the device programming or operation into/from any position of the temporary storage means.

The temporary storage means can comprise an arbitrating circuit, which is arranged to receive the requests for writing into or reading from the memory, generate signals to select a writing/reading pointer relevant to one of the sections or a writing/reading pointer relevant to the whole memory and signals to command writing/reading and to generate signals acknowledging that the operation has been carried out, to be sent to the requesting unit and check the filling condition of the individual sections, generating signals relevant to such condition;

a circuit for controlling addressing of the temporary storage means, which circuit identifies, on the basis of the selection signals generated by the arbitrating circuit, a section or position concerned in the temporary storage means and generates writing/reading commands and addresses, sending them to the temporary storage means; and a pair of registers, controlled by the addressing controlling circuit, for temporary storage of the data read from and respectively to be written into the temporary storage means.

The arbitrating circuit of the means for controlling the memory comprises:

means for selecting a writing/reading request to be served, which means can include a multiplexer at whose inputs all possible requests arrive and a counter of which the count value constitutes a command signal for setting the multiplexer, and which is stopped each time a writing/reading request is transferred to the output of the multiplexer, the count value of the counter also containing information of the type of memory operation to be performed;

a control logic network, which is arranged to receive from the multiplexer the request selected and from the counter the corresponding count value to check the memory condition to see whether the operation can be carried out, to generate, if the operation can be carried out, a writing/reading command, a command of emission of the signal acknowledging that the operation has been completed, a command for incrementing the pointer involved in the operation, and a signal for restarting the count of the counter, and to generate, if the operation cannot be carried out, an interrupt signal for the controller;

an address generation circuit, which is arranged to present at the output, in correspondence of a request and on the basis of the value of the count of the counter or of an address supplied by the controller and of the increment signal supplied by the control logic network, the address of the first position available for writing or of the first position containing data to be read in the section involved in the temporary storage means, to carry out a comparison between the reading and the writing pointers of a same section to determine the filling level and to generate, as a consequence a first status signal, which indicates whether the filling level lies between an upper threshold as an effect of a writing or has dropped below the lower threshold as an effect of a reading, and which is forwarded to the third interface means in order to cause the suspension or the resumption of data forwarding to the temporary storage means, a second status signal which indicates a full or empty condition of a section of the temporary storage means and is forwarded to said control logic network to allow the decision on whether or not to carry out an operation, and a third status signal which represents the difference between the reading and writing pointers in the first section of the temporary storage means and is forwarded to the synchronization means; and a circuit generating acknowledge signals, which generates such signals upon command from the control logic network and on the basis of the count value of the counter, corresponding to the request being served.

The synchronization means can include a circuit for reconstructing and checking the base frequency clock signal, which circuit comprises a voltage-controlled oscillator which is controlled by a signal obtained by filtering in a first digital low pass filter and converting into analog form a signal representing the difference between an instant output signal of the oscillator and a nominal value of the base frequency, extracted from the MPEG streams; and a circuit for generating the timing signal, the circuit comprising a second low pass digital filter arranged to filter, with a preset periodicity, the third status signal and to supply the filtered signal to a digital divider, which generates the timing signal by dividing a fixed frequency by the filtered value and supplies such signal to the parser.

The first and second digital filters can be programmable by the controller.

The fifth interface means can comprise means for inserting data, messages and acknowledge signals to be forwarded to the second serial line into frames organized according to a HDLC protocol and to insert the HDLC frames into a PCM frame, and means for extracting frames arranged according to a HDLC protocol from a PCM frame coming from the second serial line, for extracting data, messages and acknowledge signals from the HDLC frames, and for transferring the data to the temporary storage means and making messages and acknowledge signals available to the controller.

The sixth interface means can comprise a circuit for managing interrupt requests, comprising:

recognition means, comprising a plurality of elements associated each with a type of interrupt request, for recognizing the arrival of the requests and keeping them available until they have been served;

gate means, connected at the output of all elements in said recognition means, for signalling request arrivals to the controller;

storage means for storing the interrupt requests and comprising a plurality of elements, each element being connected to the output of an element of the recognition means and being arranged to transfer the respective request to the controller when it receives a read command from said controller;

reset means inserted between the output of each element of the storage means and a reset input of each element of the recognition means, for resetting the respective request after the arrival of the read command; and enabling means connected to the reset means, for enabling the forwarding of a request towards the controller by the recognition means only in the presence of an enabling signal supplied by the controller itself.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
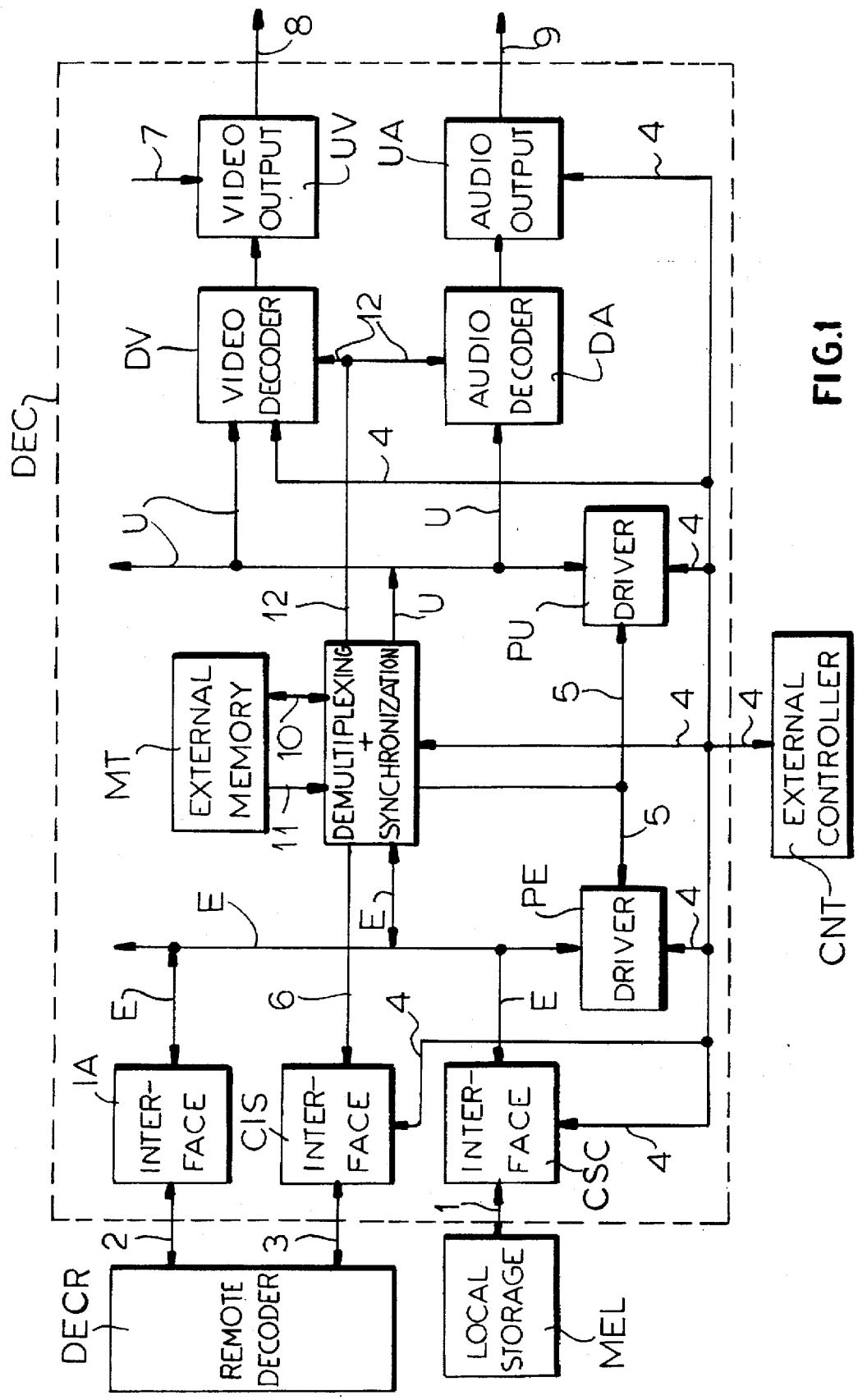
FIG. 1 is a block diagram of the device according to the invention.

Before illustrating the structure of the device according to the invention, the functions it has to carry out are briefly summarized.

The device must be able to receive MPEG audio-visual streams from multiple sources, in particular: from the hard disk of a conventional personal computer, of which the device can constitute an expansion to provide the processing power required to decode such audio-visual streams in real time; from a local digital storage device; from a remote digital storage device or from an encoder through a telecommunication network. To this end, the necessary interfaces are incorporated in the device. The device demultiplexes the video and audio information of a received stream, it decodes them and provides the user, in synchronized way, with high quality moving video pictures and audio signals of the same quality as stereo compact disks. In the decoding process, strategies aimed at eliminating the effects of transmission errors are also put in effect. Furthermore, decoded video pictures can be mixed in real time with the output signals of a conventional graphics adapter of the computer and shown in a window on the computer monitor. The device, which is realized on a board, can be pre-programmed and it can act as an autonomous device with the help of a controller present on the board, or it can be programmable from an external controller (e.g. a personal computer). The drawing shows, by way of an example, an external controller CNT and the description refers, in order to be more general, to the case in which the device is programmable.

In addition to carrying out reception and decoding functions, the device can also operate as a storage device or as a transmitter (or playback unit) of MPEG streams.

The device can be used in applications such as access to data bases of multimedia information, video-on-demand services, etc.

All this said, as can be seen in FIG. 1, the device, indicated overall as DEC, comprises:

- a section for connection to sources (or receivers, depending on the operating mode) of MPEG streams; such section is made up of the following components: interface CSC, for controlling data transfer on a bus 1 for connection to conventional computer peripheral units; interface IA, for connection with a first bi-directional serial line 2 on which data transfer occurs asynchronously; interface CIS, for connection with a second bi-directional serial line 3 on which data transfer occurs synchronously;
- a demultiplexing and synchronization circuit DES, associated with an external memory MT, intended on one hand for temporary storage of the streams to be demultiplexed and decoded and on the other hand for temporary storage of the demultiplexed audio and video streams and private data to be sent to the decoders or respectively to the controller;
- a section for emitting the audio and video data, comprising the audio and video decoders DA, DV and circuits to provide users with decoded data and to mix decoded video signals and graphic signals.

The device also comprises an input bus E and an output bus U connected to a bus 4 of external controller CNT. To simplify the drawing, in busses E, U, 4 the groups of wires intended for data transfer have not been distinguished from those intended for command and/or address transfer. Regarding data transfer, the busses are for instance 16-bit busses. Bus E is used for the exchange of information (data, commands . . . ) between IA and CSC on one side and demultiplexing and synchronisation circuit DES on the other side, for the transfer of private data included in the MPEG stream from DES to the external controller, and for the programming of such components and of CIS by external controller CNT. CIS instead is directly connected to demultiplexing and synchronisation circuit DES by means of an additional serial line 6. Bus U is used for transferring the respective streams to be decoded to audio and video decoders DA, DV and for programming the decoders themselves. The two busses E, U are connected to bus 4 by means of suitable driving circuits PE, PU, controlled (through signals forwarded over a connection 5) by circuit DES, so as to avoid conflicts for bus access by the various components. To simplify the drawing, blocks IA, CIS, CSC, DES also include the driving circuits which may be necessary to link them with the connections leading to them and the decoding circuits for the signals which allow CNT to access the different blocks.

Going back to the different blocks making up decoder DEC, unit CSC is a conventional control unit of a Small Computer System Interface (SCSI) for reading and writing MPEG data only from and into a peripheral unit (e.g. a local digital storage device MEL) connected to bus 1. Unit CSC is connected both to bus E, for MPEG data transfer, and to bus 4 of the external controller in order to be programmed by the controller. For example, unit CSC is realized by means of component AM53C94 marketed by Advanced Micro Devices. The characteristics and operating modes of such component are not influenced by the present invention and they are reported in the component data sheets.

Device IA, as previously stated, is to interface decoder DEC with an asynchronous serial line 2 which can convey data coming from an MPEG encoder or from a remote memory device, e.g. through a remote decoding device DECR identical to DEC. Interface IA is a circuit that essentially acts as a protocol converter, transforming bi-directional serial line 2 into a pair of parallel ports, one for signal input and the other for signal output, connected to input bus E. Interface IA can be realized, for example, by component C011 manufactured by the firm INMOS. The characteristics and operating modes of this component are not influenced by the present invention and they are reported in the component data sheets.

Unit CIS is to interface device DEC with a synchronous serial line 3 which, analogously to line 2, allows connection with a remote device DECR. Line 3 is to convey data transmitted, for instance, in accordance with the protocols established by CCITT Recommendations G.703, G.704 with regard to physical layer and frame structure. In this case line 3 is, for example, a 2 Mbit/s line on which transmission takes place in accordance with a HDLC (High Layer Data Link Control) protocol, overlaid on a PCM frame of thirty-two 64 kbit/s channels. Data transmitted on line 3 can comprise, in addition to MPEG data, also data related to fixed pictures, subtitles, texts and graphics and, in general, data and commands which cannot be inserted in the MPEG streams. The latter data and commands are exchanged in the form of messages whose flow is regulated by appropriate control signals provided by DES. Local decoder DEC and the remote one, DECR, also exchange, through the same line, the acknowledge signals prescribed by data transfer protocols. Interface CIS can, for instance, be realized by means of component PCMSC V7311, manufactured by Italtel. The characteristics and operating modes of this component are not influenced by the present invention and they are reported in the component data sheets.

When the device acts as a decoder, any one of the aforesaid interfaces can receive data and send them to circuit DES for demultiplexing. When the device acts as a transmitter of MPEG streams, the MPEG data are taken through interfaces CSC or IA upon controller's command and are supplied to interface CIS to be forwarded along line 3 towards device DEC associated to the receiver; through interface CIS, the device can also receive and transmit non-MPEG data, as stated above. When the device acts as a storage device, it will be able to receive and transmit data (MPEG or non-MPEG) through CIS: the data received are forwarded to controller CNT, and the data to be transmitted are supplied by the same controller.

Block DES acts as system-layer controller and puts into effect the different operating modes of the device depending on the programming provided by the controller.

In particular, in case of decoding, DES must recognize the different types of signal (audio, video and private data) in the MPEG streams, separate them and supply them to the utilization devices (decoders or controller) and manage synchronization; in the course of demultiplexing, DES also detects errors due to transmission on a noisy channel and indicates them to the external controller. DES is connected to external memory MT, which is a Dynamic Random Access Memory (DRAM), through a bi-directional data bus 10 and a connection 11 for memory addressing and control.

For synchronization, DES exploits information contained in the MPEG data stream, and in particular the system clock references SCR which allow local reconstruction of the system clock signal CKS at 90 kHz.

When device DEC instead functions as a transmitter or memory device, DES could even be transparent to the data streams and no demultiplexing should be effected.

Video Decoder DV, which can be programmed by external controller CNT, receives the compressed video data from DES through bus U, decodes them with the procedures prescribed by the MPEG standard and provides the decoded video signals to a video output unit UV, which is to carry out all processing necessary for a picture to be inserted into a desired display window. UV also includes a built-in output digital-to-analog converter. If the device is used in association with a personal computer, block UV also includes components for overlaying decoded pictures to graphic signals provided by the computer in the form of RGB digital signals through a connection 7. The analog video signals resulting from decoding arc presented on an output 8. Video decoder DV is conventional and it can be realized for example by means of component CL450 by C-CUBE. The components of block UV are also conventional and they can be those carrying out the same functions in association with the above component in the "CL 450 Development Kit" mentioned above.

Audio decoder DA receives, through bus U, the compressed audio packets to be decoded and carries out decoding operations as prescribed by the standard. The audio decoder, which can be for instance component L64111 by LSI Logic Corporation, provides the decoded audio signals to an audio output unit UA comprising a digital-to-analog converter, a processing circuit to perform the signal processing required by the user and an output amplifier. Audio signals are then provided to the user through connection 9.

Figure 2:
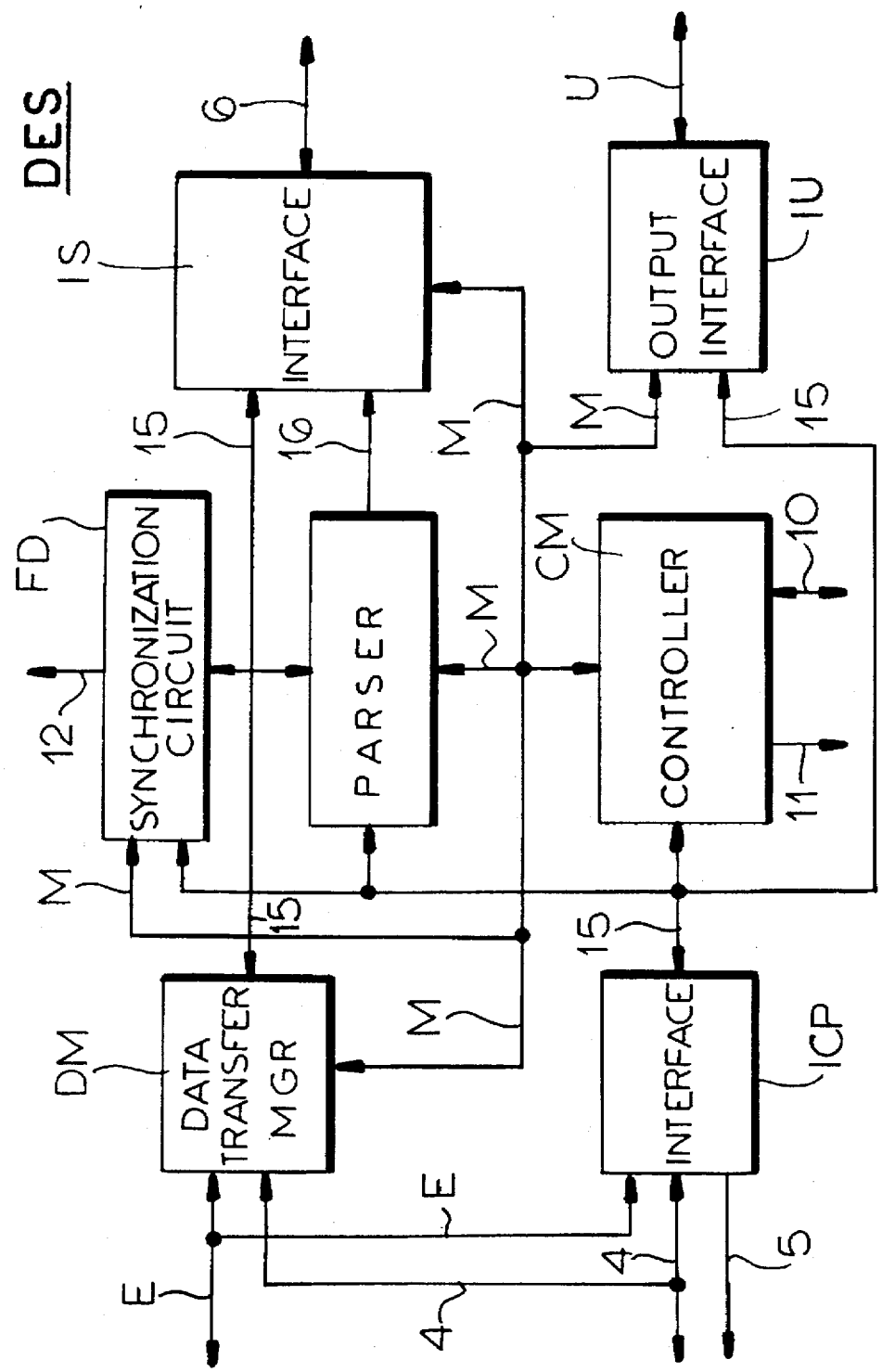
FIG. 2 is a block diagram of the demultiplexing and synchronization circuit (block DES in FIG. 1)

With reference to FIG. 2, demultiplexing circuit DES essentially comprises: a parser PA, which separates the video and audio streams and the private data and extracts synchronisation information; a controller CM of memory MT; a unit DM for managing data transfer from bus E to the memory and vice versa; devices IS, ICP for interfacing circuit DES with synchronous serial line 6 (FIG. 1) and controller CNT; circuits FD for carrying out synchronization operations; an output interface IU for interfacing with video and audio decoders.

Figure 3:
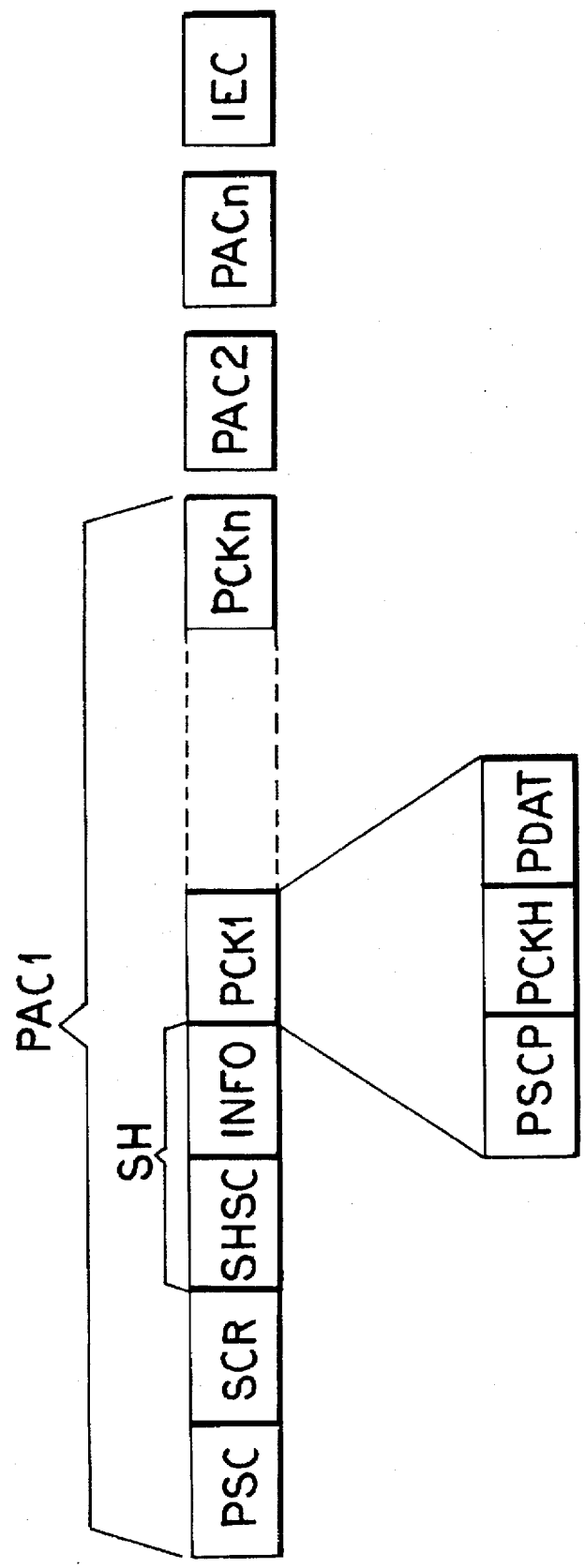
FIG. 3 is a representation of the organization of data in accordance with standard MPEG-1.

Parser PA exploits, for its operation, service information contained in particular fields of the MPEG streams, which fields start with a code allowing them to be identified. To make it easier to understand the functions of parser PA, FIG. 3 shows the structure of ISO 11172 layer and of the audio-visual pack layer, pointing out information of interest to the invention. Additional details are specified in Part 1 of the standard.

A transmission arranged in accordance with MPEG standards is made up of a succession of packs (data or synchronism information) PAC1, PAC2 ... PACn, each comprising, as indicated for PAC1:

a pack start code PSC, a group of words SCR which code the SCR information;

a System Header SH, if any, which starts with a System Header Start Code SHSC and contains service information (INFO) which is valid for a set of packets. Information contained in this header and of interest for the operation of parser PA shall be examined further on;

a certain number of packets PCK1 ... PCKn: as indicated for PCK1, each packet starts with a Packet Start Code Prefix PSCP, followed by a packet header PCKH and then by data PDAT; prefix PSCP contains i.a. information on packet type (audio/video/private data), while the header contains the identity of the stream to which the packet refers, the length of the packet and other information used by the decoders, in particular time information PTS (Presentation Time Stamp) and DTS (Decoding Time Stamp).

The last pack, PACn is followed by an end code IEC (ISO 11172 End Code).

The structure and the operation of parser PA will be described with reference to FIGS. 5–9.

Going back to FIG. 2, memory controller CM manages external memory MT so that the latter is functionally subdivided into four sections, each arranged in a FIFO structure, intended respectively to temporarily store the incoming streams and the demultiplexed audio, video and private data to be sent to the decoders or to the external controller. The structure of CM shall be described further on, with reference to FIGS. 16, 17.

Unit DM comprises means for managing data exchange between memory MT (FIG. 1) and units IA and CSC (through bus E) or controller CNT (through busses E and U). Data exchange is managed in accordance with the usual Direct Memory Access (DMA) protocols, which prescribe the emission of a data request signal by one of the components involved in the exchange and of a signal acknowledging data forwarding by the other one. Data transfer manager DM is connected to memory controller CM through a bus M, to which parser PA, serial interface IS and output interface IU are also connected.

Figure 4:
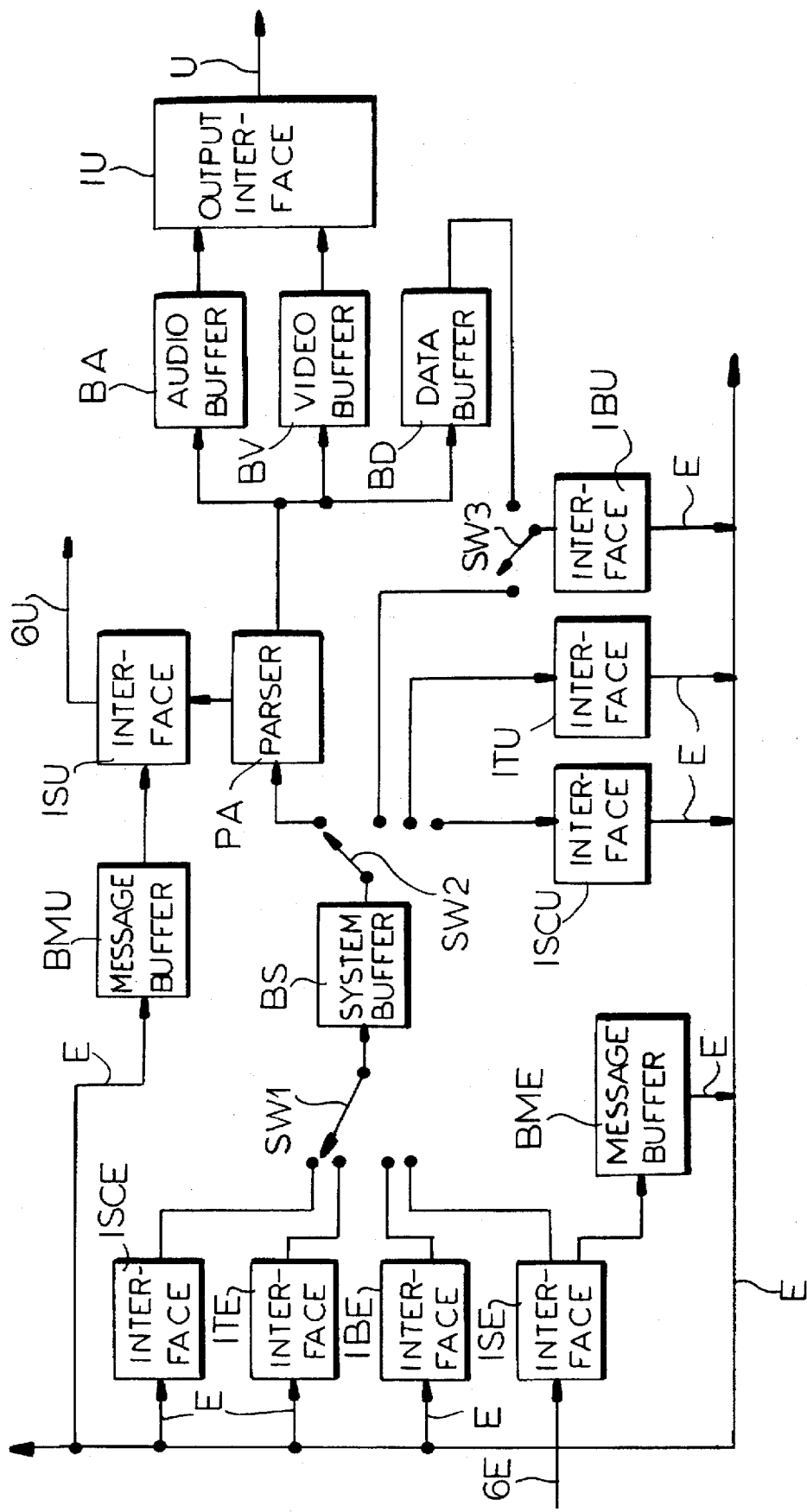
FIG. 4 is a logic diagram of the data flow through the demultiplexing and synchronization circuit.
Figure 10:
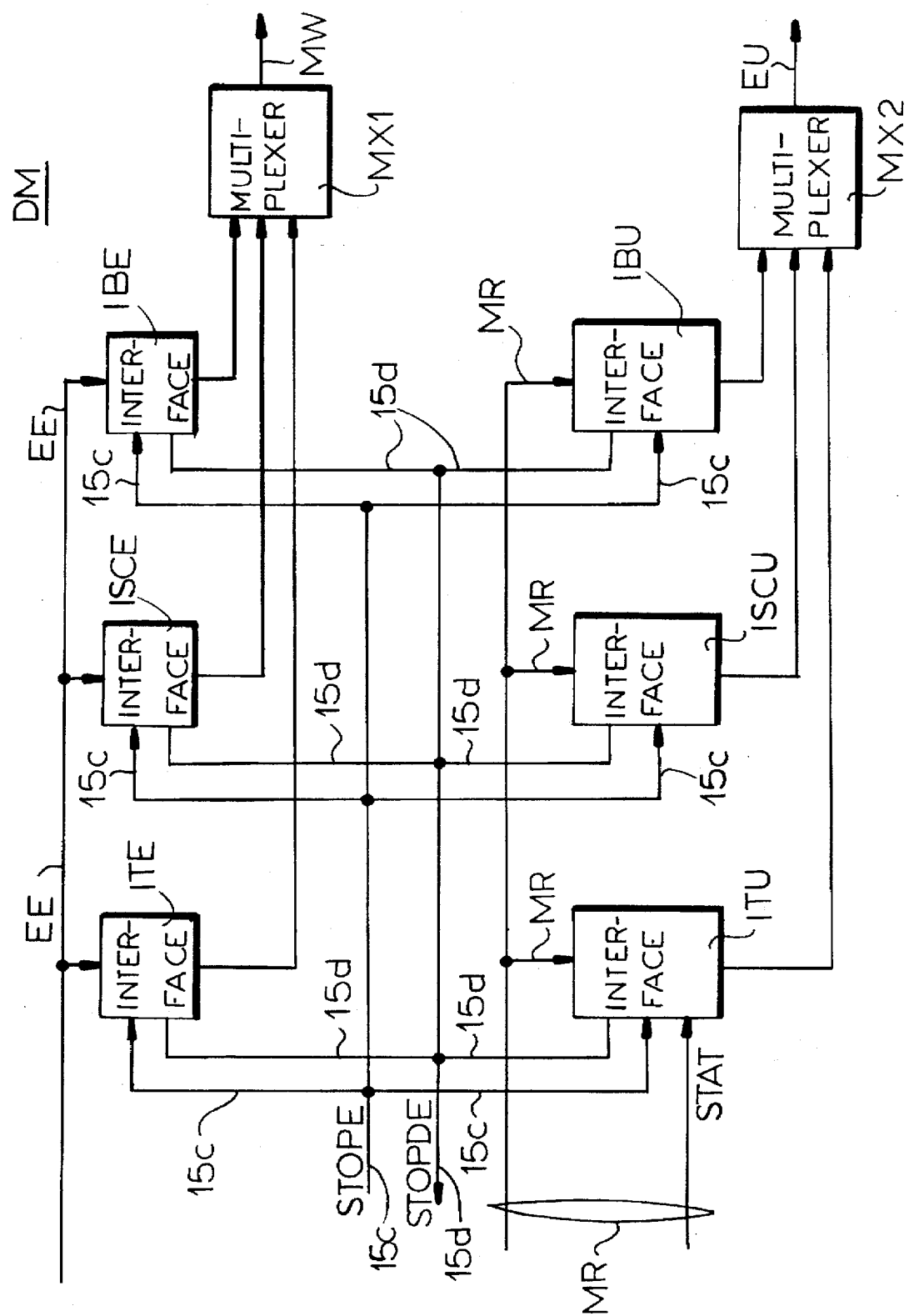
FIGS. 10–19 are more detailed diagrams of other units in the demultiplexing and synchronization circuit.

The structure of data transfer manager DM is depicted in greater detail in FIGS. 4 and 10.

Serial interface IS is to extract, from a PCM frame incoming on line 6, information, arranged in accordance with a HDLC protocol, which are to be processed in parser PA and, conversely, to arrange in accordance with the HDLC protocol and insert into a PCM frame, information to forwarded along line 6 and coming from parser PA through a connection 16. The structure of IS will be described in greater detail with reference to FIGS. 13–15.

Output interface IU is to extract, upon request by decoders DA, DV (FIG. 1), audio and video streams from the respective sections of memory MT and to send them to the decoders. In practice, IU consists of a pair of registers, one for each type of stream, of which the inputs are connected to bus M and the outputs are connected to bus U. Data writing and reading occurs upon request by the respective decoders. Retrieval of the stored signals and their transmission to the decoders are also managed in accordance with DMA protocols.

Interface ICP towards controller CNT (FIG. 1) is to manage addressing by CNT of the internal registers of DES (i.e. the registers storing information related to programming of DES, supplied by CNT, and information on the status of DES, made available to CNT) and forwarding of interrupt signals (intended for instance to indicate errors, alarms or data availability) towards CNT, and to arbitrate access to busses E, U by the different circuits of DES or by controller CNT. Connection 15 outlines the set of wires for exchanging data and other signals between ICP and the other components of DES. The structure of ICP will be described with reference to FIGS. 11 and 12.

Block FD comprises the distal part of a phase locked loop (PLL) to reconstruct system clock CKS starting from indications SCR extracted by parser PA and provided through connection 13, and a circuit for generating a further signal CKESTR, to be provided to parser PA, which locks the data reading frequency from MT to the writing frequency. Note that the analog part of the phase lock loop (made up of a voltage controlled oscillator and by a digital-to-analog converter) in reality is external to device DES, but it was not represented as a separate block to simplify the drawing. The structure of FD will be described further, with reference to FIGS. 18 and 19.

The more detailed diagrams which follow do not indicate the signals related to the protocol for transferring data among the various components of DES and between these and controller CNT (in general, request for data sent by a first component to a second, acknowledge by the latter of the data forwarding and availability of the first component for a new operation), when such signals are not essential for comprehension of the invention, as they are altogether conventional; to keep the drawing simple, the means for locking the received signals to the internal timing of each component were also left out; these means, too, are totally conventional.

FIG. 4 is a logic diagram of the data flow through DES. The final letters E, U of the reference symbols indicate input and respectively output elements in DES. In this Figure, block DM shown in FIG. 2 has been split into the interfaces for connection with blocks IA, CSC, CIS and with bus 4 in FIG. 1, and each of these interfaces is in turn subdivided into an input section (ITE, ISCE, ISE, IBE respectively for connection with IA, CSC, CIS and bus 4) and an output section (ITU, ISCU, ISU, IBU). Note that data transfer between DM (FIG. 2) and bus 4 occurs via bus E, as said, and therefore blocks IBE, IBU are connected to bus E. Moreover in the diagram the external memory is divided into its four functional parts BS, BA, BV, BD, the first of which, as stated above, temporarily stores incoming streams (system buffer) while the others store demultiplexed audio and video streams and private data (audio, video and private data buffers). In an exemplary practical embodiment, the external memory has a capacity of 64 Kwords (16 bits each) distributed among the four functional parts in the following manner: BS 16 Kwords; BA 32 Kwords; BV, BD 8 Kwords each. Where required, reference will be made to this example.

Having stated the above, when device DEC is used as an actual decoder, audio-visual streams coming from any one of the decoder inputs and conveyed by means of bus E or input part 6E of serial line 6, enter DES through one of the interfaces ITE, ISCE, IBE or ISE. Only one input of DEC, and therefore only one of the input interfaces above, can provide signals to DES at any given instant: the mutually exclusive operation is represented schematically by switch SW1 inserted between the interfaces themselves and system buffer BS. The streams to be decoded, read from BS, are transferred to parser PA which splits the streams into the, audio, video and private data components and routes them towards audio, video and private data buffers BA, BV, BD; video and audio signals are then forwarded towards their respective decoders through bus U, while private data are sent towards IBU and from here to the controller, through bus E.

When device DEC functions as a transmitter, MPEG data provided by the sources enter through interfaces ISCE, ITE or IBE and after storage they are sent to serial interface ISU; messages (non-MPEG data) to be forwarded towards IBU can arrive through ISE.

When the device functions as a storage device, MPEG data arrive through ISE and are forwarded towards IBU. In these two cases, demultiplexing may or may not be carried out in PA.

The Figure also indicates buffers BME, BMU for temporary storage of messages received through ISE and respectively of messages to be transmitted through ISU. It must be stated that, although buffers BME, BMU are represented as separate blocks, they are actually an integral part of interface IS, as shall be seen further on.

The different outputs of BS are also activated in a mutually exclusive way, as shown schematically by switch SW2. Additional switch SW3 represents the possibility for IBU to receive data either from BS or from BD.

Figure 5:
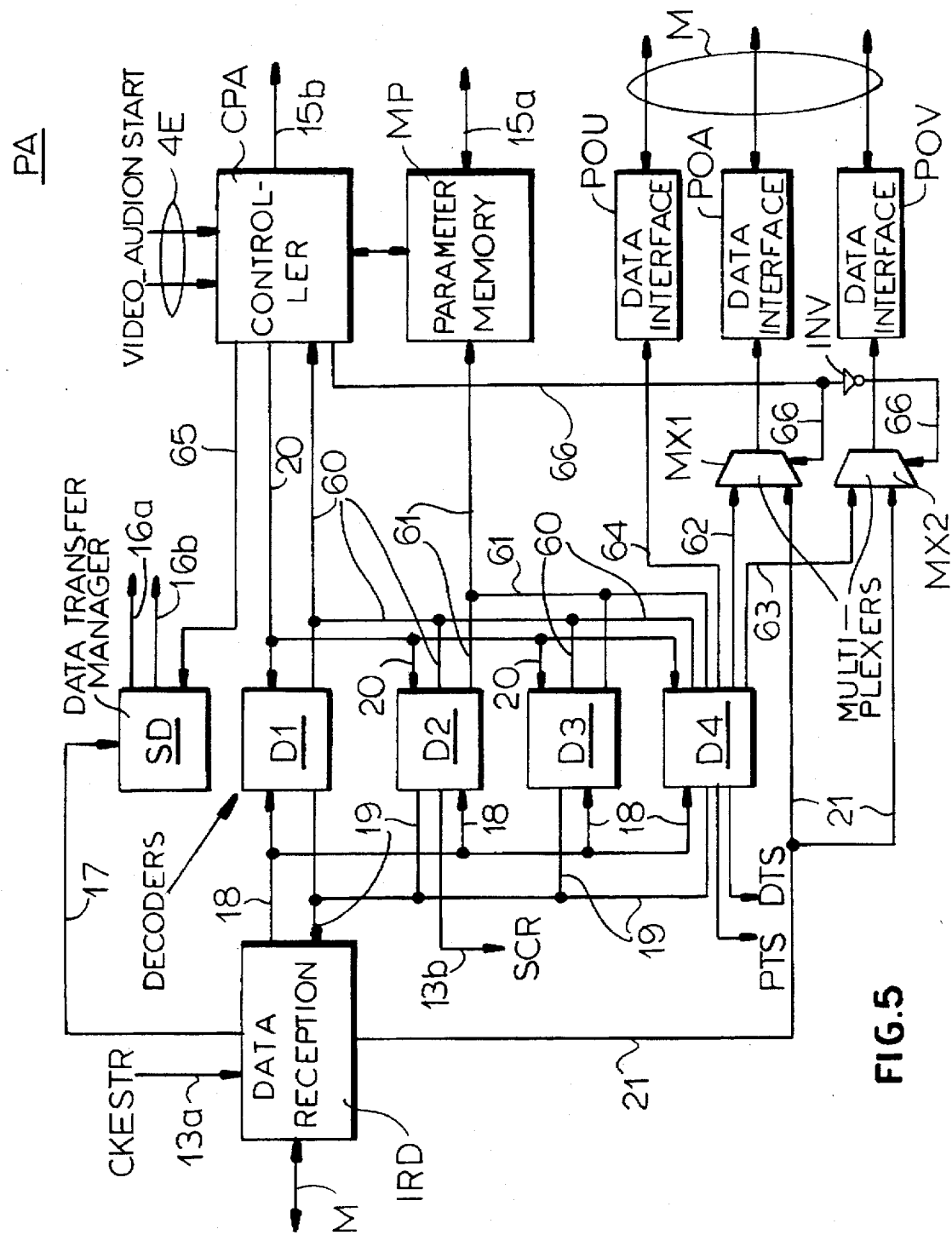
FIG. 5 is a logic diagram of the parser included in the demultiplexing and synchronization-circuit (block PA in FIG. 2)

With reference to FIG. 5, in parser PA an incoming data reception unit IRD receives from memory controller CM, through bus M, the data read in BS (FIG. 4) and transfers them to the subsequent components after organising them into a suitable format for these components. The exchange of data occurs with a conventional protocol entailing a request to read data by IRD and acknowledge of the dispatch by CM. For bus M, too, the Figure does not distinguish the groups of wires carrying data from those transporting signals related to the protocol or other commands. Data are requested by IRD to CM with a frequency determined by signal CKESTR (wires 13a of connection 13 linking PA and FD, FIG. 2), and a reading operation automatically causes the memory reading pointer to advance, in a thoroughly conventional manner. To keep the drawing simple, individual request and acknowledge signals are not indicated in the drawing. In practice, IRD is made up of a shift register which carries out a 16-to-8 bit conversion of the data words read and, on the basis of the information communicated by downstream components, supplies them with a new block of data from which data already used have been eliminated.

Data read from IRD are made available, through a connection 17, to a unit SD which manages the transfer of data towards serial interface IS (FIG. 2), and, through a connection 18, to four decoding logic networks D1–D4.

Unit SD is to organize the data as required by serial interface IS, in practice by carrying out an 8-to-16 bit conversion, and to supply the write and address increment commands for input buffers contained in IS. Data are present on wires 16a and commands on wires 16b. The two groups of wires together form connection 16 in FIG. 2. Unit SD is enabled, when necessary, by signals provided by a control unit CPA through connection 65.

Logic network D1 is to recognize the codes identifying the fields allotted to service information concerning system layer and to indicate to control unit CPA the detection of a code and the type of code through a connection 60, which includes also the lines conveying information emitted by logic networks D2–D4 to CPA.

Logic network D2 is to extract time indications SCR to be made available to circuits FD (wires 13b of connection 13); these indications are also provided to a parameter memory MP (through a connection 61 which includes also the lines on which the exchange of information between MP and D3, D4 occurs). Memory MP can also be accessed by the external controller (through interface ICP, FIG. 2, and wires 15a of connection 15) which reads the information written by the decoding logic networks and writes programming data for DES.

Logic network D3 is to extract information contained in the system header and to send it to parameter memory MP. Information of interest for the invention shall be evident from the description of the operation of PA.

Logic network D4 decodes the packet headers and, on the basis of the packet header contents and with procedures determined by the programming information contained in MP, sends, through connections 62, 63, 64, private data, audio signals and video signals respectively to units POU, POA, POV. In a preferred embodiment of the invention, parser PA is able to extract simultaneously the packets related to one of the streams of private data, one of the audio streams and one of the video streams multiplexed in the MPEG stream. The identity of these streams can be determined by programming information contained in MP; in the absence of a specific indication, D4 will extract the first stream identified for each type. In both cases, data from the other streams will be discarded. Through bus M, units POU, POA, POV then supply CM with the signals received from D4 for writing into buffers BD, BA, BV (FIG. 4). This transfer also occurs with the conventional procedures entailing a write request by the units in PA and acknowledge of the operation completion by CM.

D4 also extracts, from the packets received, time indications DTS, PTS already examined above; these indications arc utilised with procedures that depend on the type of audio and video decoders used, and arc also written into parameter memory MP, along with the identity of the stream to which the packet refers and to the length of the packet.

Logic networks D2–D4 arc enabled in a mutually exclusive way by CPA by means of signals emitted on a connection 20, and they supply CPA with information on errors and severe anomalies, which alter or bar regular operation of the device.

Ports POU, POA, POV are each made up essentially of a register with 8 bit input and 16 bit output and of a logic network for managing the protocol for signal transfer to the respective sections of memory MT (FIG. 1).

Control unit CPA manages all the circuit operations according to the data contained in parameter memory MP (FIG. 5), to the information received from logic networks D1–D4 and to possible external signals, provided by the controller and present on wires of part 4E of bus 4 coming into DES (FIG. 1). Among the external signals, we mention here a signal START for activating the device operations and a signal VIDEO_AUDION which, along with information contained in MP, disables decoding of the audio and video packets when these operations are to be carried out in other circuits. For this purpose the inputs of POA, POV are connected to the outputs of respective multiplexers MX3, MX4 which are controlled by CPA through a signal present on a connection 66 and which have a second input connected to an additional output connection 21 of IRD, on which the packets are present. The two multiplexers are operated in a mutually exclusive way, as indicated by inverter INV.

CPA signals errors or anomalous situations to interface ICP (FIG. 2) in the form of interrupt requests emitted on wires 15b of connection 15.

The operation of device PA shall now be described, referring also to the flow charts in FIGS. 6–9.

Figure 6:
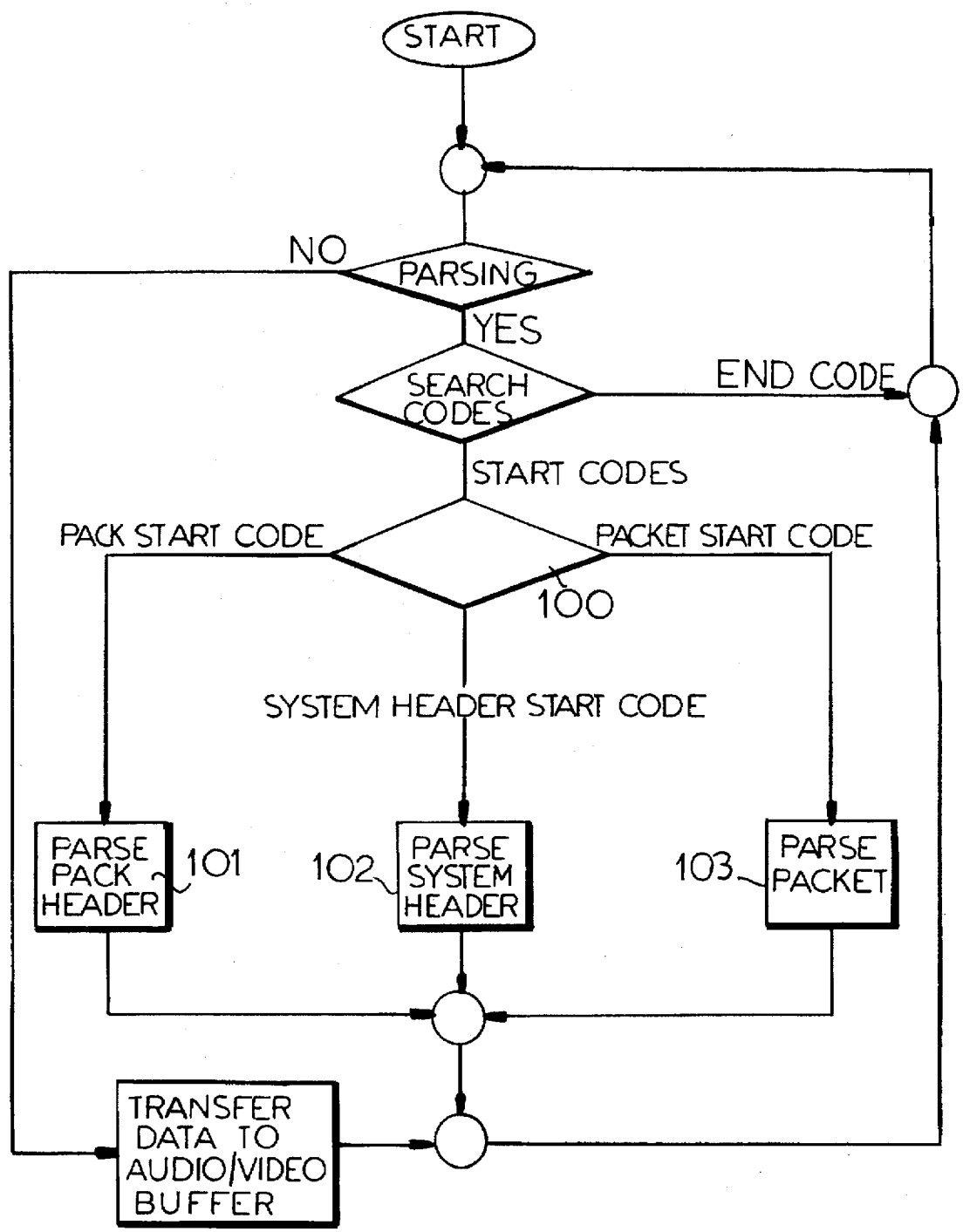
FIGS. 6–9 are flow charts of the operations of the parser.
Figure 7:
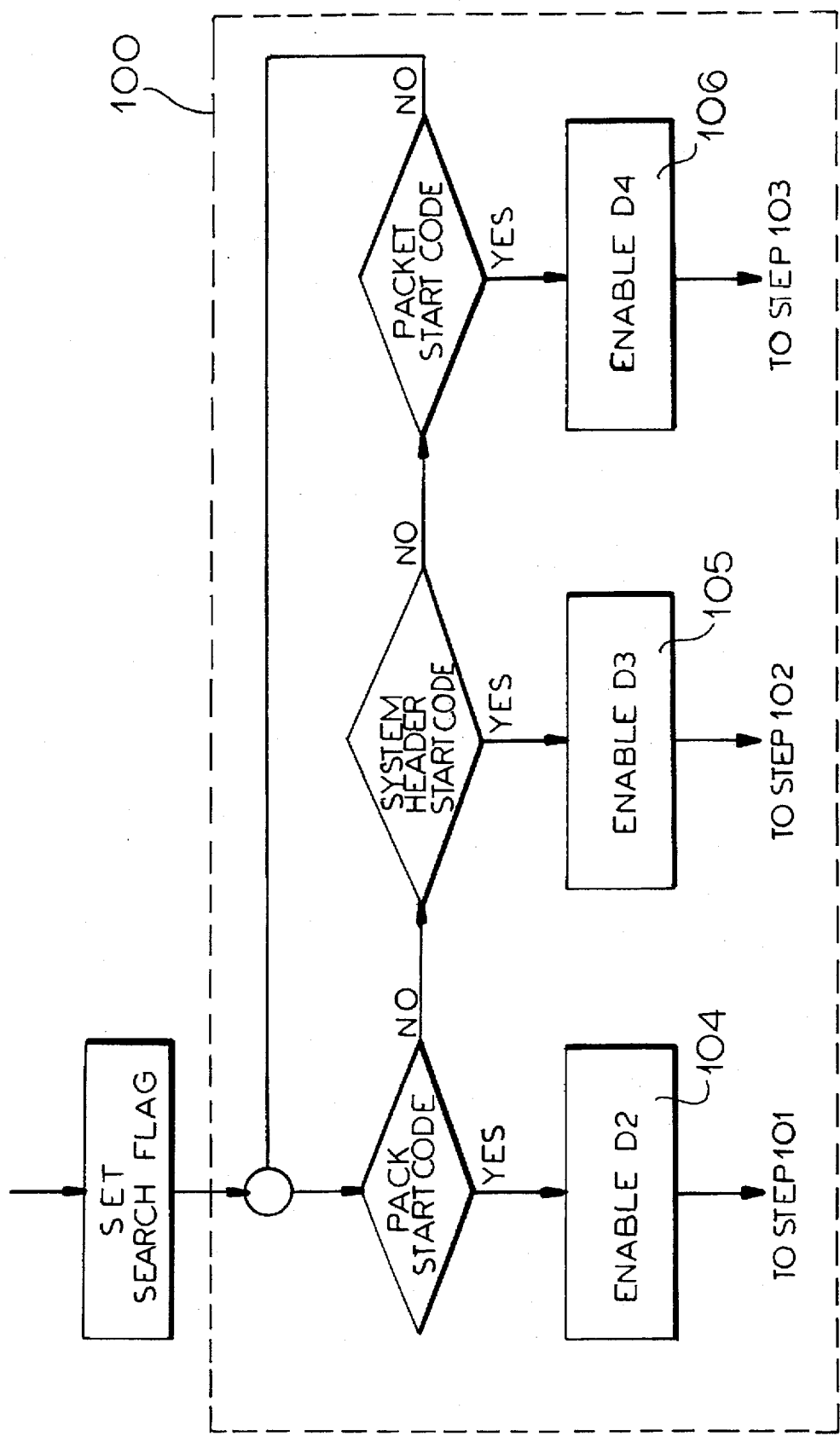

As can be seen in FIG. 6, after receiving the START signal, the parser control unit CPA (FIG. 5) must first check whether signal VIDEO_AUDION indicates that parsing is or is not to be effected. In the latter case, as stated above, CPA positions multiplexers MX3, MX4 on the input linked to connection 21 so that the packets are transferred directly from IRD to output ports POA, POV. If parsing is to be effected, CPA positions the multiplexers on the inputs connected to the outputs of D4, enables logic network D1 and starts waiting for a code (SEARCH CODES). Under regular operating conditions, D1 should detect first a pack start code, then a possible system header start code and then the packet start codes. As long as the pack start code is not arrived, all bits arrived to circuit DES are discarded. Upon the arrival of each code (step 100), D1 decodes it and CPA will follow three different paths depending on the code received. The three paths are indicated synthetically in FIG. 6 by steps 101 (parse pack header), 102 (parse system header), 103 (parse packet). Each of these three paths corresponds respectively with the enabling of one of the logic networks D2–D4, as indicated by steps 104, 105, 106 in FIG. 7. Note that step "SET SEARCH FLAG" in FIG. 7 corresponds to step "SEARCH CODES" in FIG. 6.

If the code is the pack start code, logic network D2 (FIG. 5) parses the pack header (step 101), extracting system clock references SCR and providing them to block FD (FIG. 2) for reconstruction of signal CKS.

Figure 8:
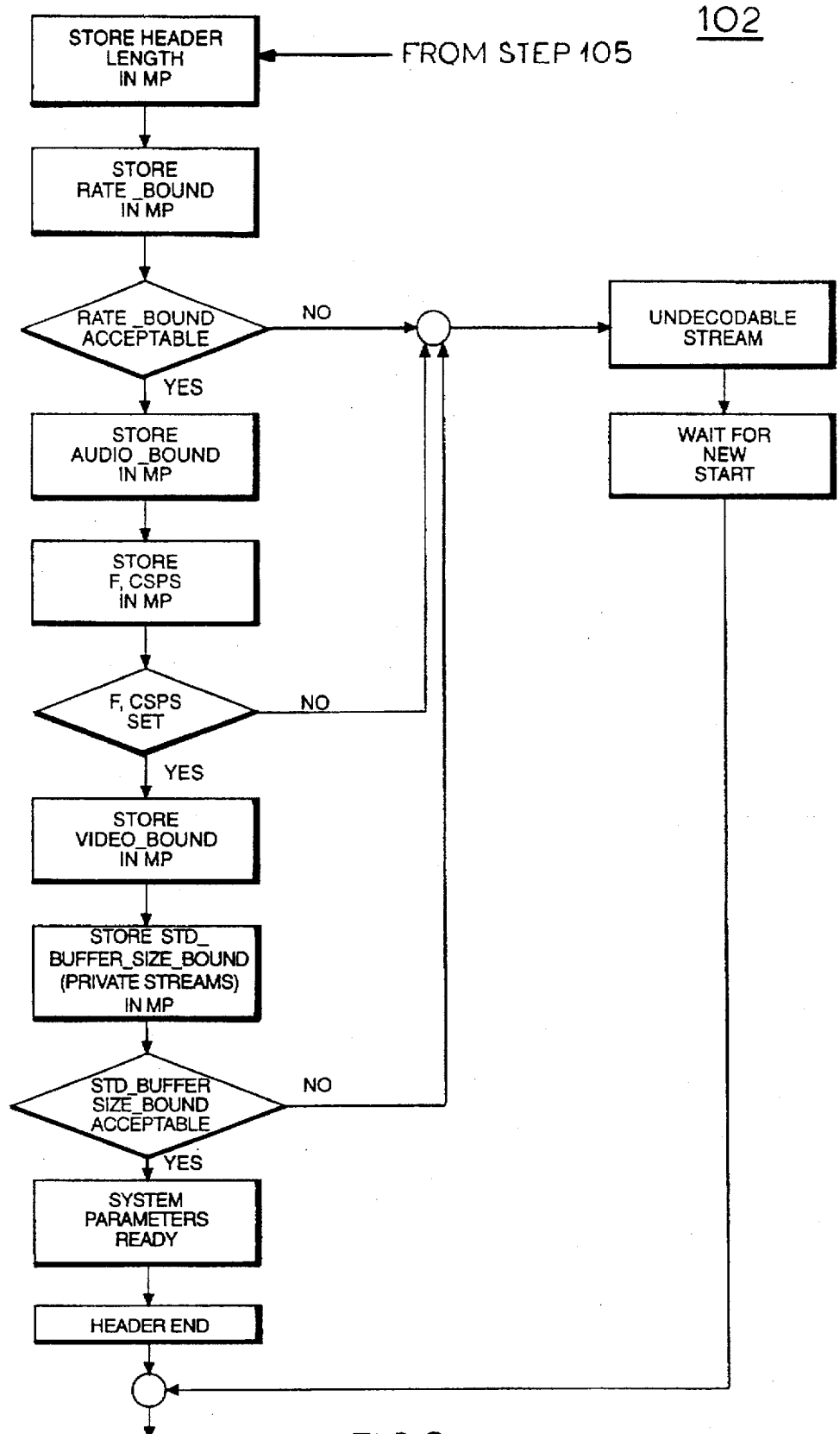

When a system header start code is recognized, the operations of step 102, illustrated in greater detail in FIG. 8, are carried out. Logic network D3 (FIG. 5) must decode certain parameters contained in the header and supply them to parameter memory MP. The meaning of these parameters, which are indicated in the flow chart in FIG. 8, is known from the standard. CPA carries out checks on the values of some of these parameters—in particular those related to the stream rate (RATE_BOUND) and to the minimum memory size required by private data (STD_BUFFER_SIZE_BOUND), and a pair of flags F and CSPS indicating characteristics of the flow (transmission at fixed rate and bound parameters)—to verify whether the values themselves are acceptable (stream rate and memory capacity) or are the desired ones (for the two flags). If the outcome is negative, a signal that decoding is impossible is generated and presented on one of the wires 15b. Under these conditions, the parser operations are blocked until the arrival of a new START.

Figure 9:
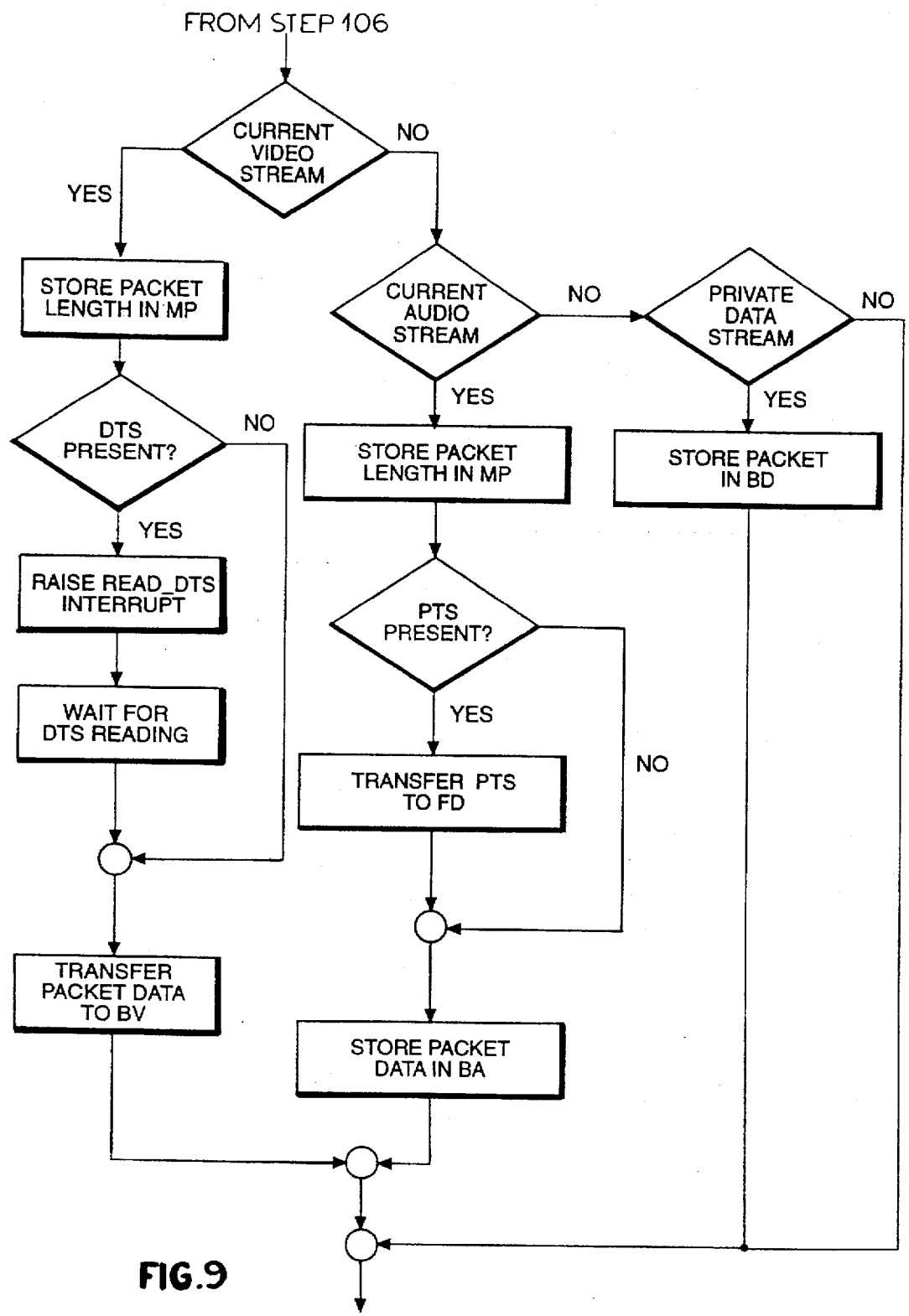

If the code received is a packet start code, the operations of step 103, shown in greater detail in FIG. 9, are carried out. CPA enables D4 to decode information contained in the packet header, in particular the identity of the stream to which the packet belongs, to verify whether the stream is actually the one being processed. If the header indicates that the packet is a video packet belonging to the current stream, the length of the packet is stored in MP; the presence of signals DTS (if any) is indicated to the external controller and, after the controller reads these signals, the transfer towards POV of the data contained in the packet is commanded for the subsequent forwarding to video buffer BV (FIG. 4) and then to video decoder DV (FIG. 1).

If the packet is not a video packet, CPA examines whether it is an audio packet or a private data packet. If it is an audio packet belonging to the desired stream, its length is stored in MP, the signals PTS which may be present are read and the transfer of the data contained in the packet towards POA for storage in BA is commanded. If it is a private data packet, the forwarding of the data contained in the packet towards POU for storage in BD is commanded.

When PA eventually receives the end code, it goes back to rest.

It should be stated that, regarding video signals and private data, only "net" data are transferred to the output, that is data without the service information contained in the header, as prescribed by the standard. For audio, it is possible both to transfer net data, as prescribed by standard ISO/IEC 11172-3, and to transfer the whole packet, depending on the characteristics of the audio decoder.

FIG. 10 shows the block diagram of data transfer manager DM. Elements also illustrated in FIG. 4 are indicated with the same references. DM comprises an input section (blocks ITE, ISCE, IBE) which transfers data coming from IA, CSC and CNT (FIG. 1) on a connection Eli to memory controller CM, through a multiplexer MX1 and a connection or bus MW, representing that part of bus M which conveys signals directed to memory controller CM (FIG. 4), and an output section (blocks ITU, ISCU, IBU) which routes to IA, CSC and CNT, through a multiplexer MX2 and a connection EU, signals read in BS and present on a connection or bus MR, representing that part of bus M (FIG. 2) destined to convey signals outgoing from CM. Connections EE, EU and MW, MR are unidirectional connections obtained by separating, in a thoroughly conventional way, the two directions of transmission of busses E and respectively M at the input into DM.

If the device of the present invention is placed on the decoding side of a transmission system for MPEG streams, circuit ITE receives 8-bit data blocks from IA and arranges them into 16-bit blocks to be transferred to controller CM and to BS. Circuit ITU receives from controller CM, through an appropriate wire of bus MR, information on the filling level of memory BS (signal STAT which shall be examined in the course of a detailed description of CM) and sends towards IA, through a wire of EU, a request to discontinue data transmission, if the filling level of BS has exceeded an upper threshold, or a request to resume transmission, if the filling level of BS has dropped below a lower threshold. Both thresholds are programmable.

If the device is used on the transmitter side, ITU will split the 16-bit blocks of data read in the memory into two bytes and will send them sequentially to IA; ITE receives from IA and sends to CM feedback signals coming from the receiver.

ITE, ITU are each realized by means of two finite-state machines, one dedicated to receiving data from outside and forwarding them to the memory, and the other one to managing control signals. Since the dialogue protocol is standard, the expert in the field has no problem in realising these devices.

Circuits ISCE, ISCU, IBE, IBU comprise a pair of registers in a ping-pong arrangement (i.e. a pair of registers alternating at each cycle in the reading and writing operations) and a logic network for managing request/ acknowledge signals prescribed by the protocol. Data coming in or going out through these circuits in the different modes of operation are clearly shown by what has been described above.

Through wires 15c of connection 15, all circuits in DM also receive from ICP (FIG. 2) command STOPE to stop respective operations when controller CNT (FIG. 1) requests access to bus E, and they send to ICP, through wires 15d, which also belong to connection 15, a signal STOPDE to acknowledge that the stop has occurred.

Figure 11:
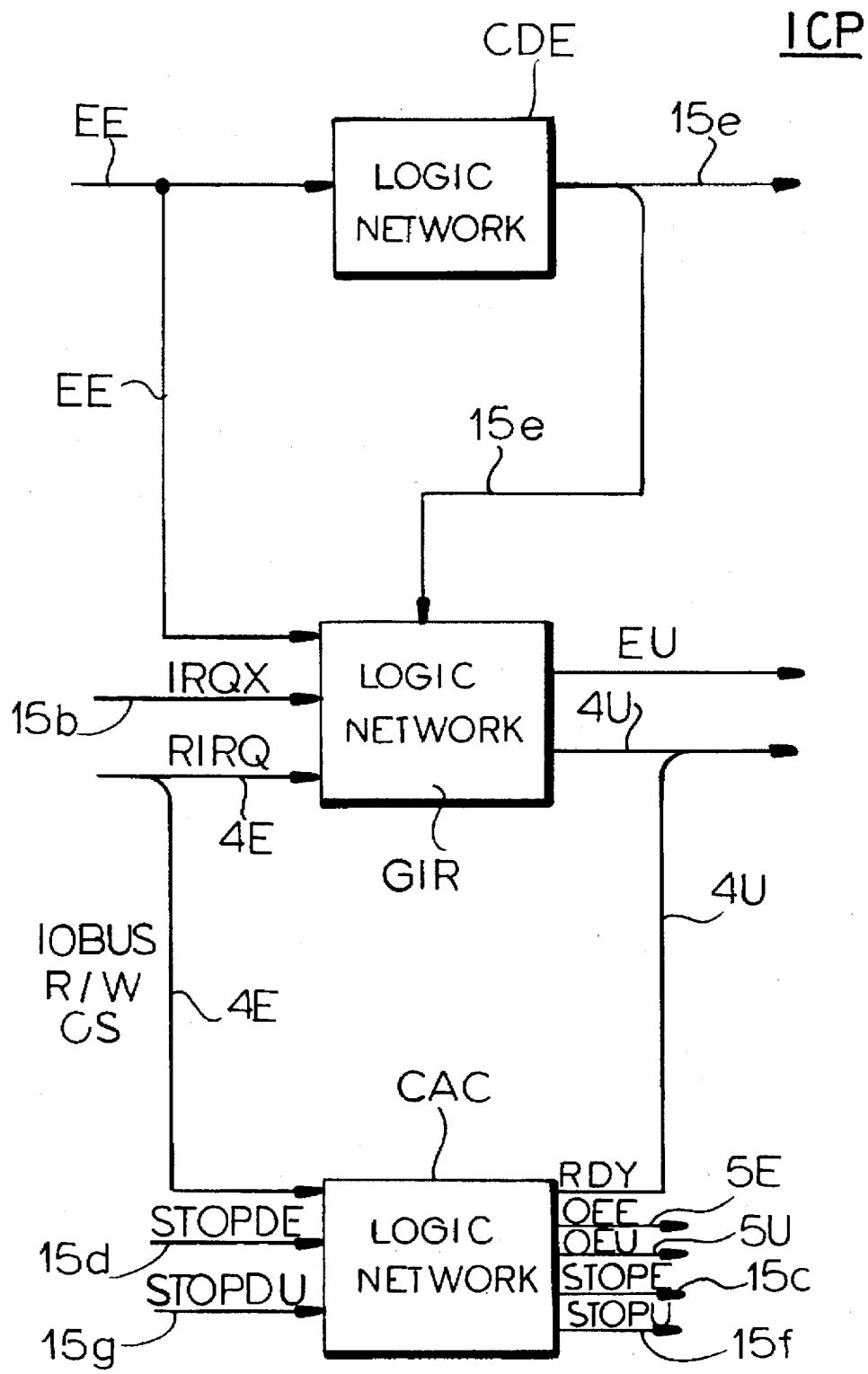

With reference to FIG. 11, block ICP comprises three logic networks GIR, CDE, CAC which respectively are to manage the interrupt requests, to decode the addresses of the internal registers in DES and to arbitrate access requests to busses E, U (FIG. 1) coming from DM, IU (FIG. 2) or controller CNT.

GIR receives interrupt requests from PA, CM and IS through wires 15b of connection 15, each wire being associated with a specific request IRQX. It is assumed, by way of example, that 16 distinct requests can reach GIR. In the presence of such requests, GIR sends a flag IRQ to controller CNT (FIG. 1) through a wire of bus 4U (which represents the part of bus 4 that egresses from DES) and subsequently, when receiving command RIRQ from CNT through bus 4E, it makes available the requests on bus EU. GIR also comprises means to prevent requests arriving while a previous request is being processed, from being erased without having been served. The structure of GIR shall be described with reference to FIG. 12.

Circuit CDE managing register addressing accomplishes an indirect addressing, which entails, in an initial operation, dispatching the address to CDE and, in a second operation, actually writing/reading the data into/from the register. CDE essentially consists of a decoder which receives the address through bus EE and presents, on wires 15e of connection 15, the enabling signals for the individual registers. Indirect addressing is a well known technique for the skilled in the art and therefore circuit CDE does not require a more detailed description.

Circuit CAC manages access to busses E, U so that these busses are normally assigned to DM or respectively to IU and are assigned instead to controller CNT (FIG. 1) when the latter requests so. The circuit comprises two identical elements, each of which manages access to one of the two busses. The access request by the controller is signal IOBUS which is presented by CNT on one of the wires of bus 4E and indicates, depending on its logic value, whether access to bus E or to bus U is involved. As a consequence of the request, CAC generates, depending on the element concerned, the signal STOPE (wires 15c) or STOPU (wires 15f) requesting operations of circuits DM or IU to stop; after receiving acknowledge signals STOPDE, STOPDU, provided by the components involved through wires 15d, 15g and indicating that the stop has occurred, CAC will generate enabling signals OEE, OEU for the driving circuits PE, PU on wires 5E, 5U, which form connection 5 in FIGS. 1, 2; CAC will also receive the usual reading/writing (R/W) and chip select (CS) commands and it will send the availability signal RDY to the controller. A circuit of this kind is totally conventional.

Further input/output signals into/from ICP will result from the description of other blocks of DES (FIG. 1).

Figure 12:
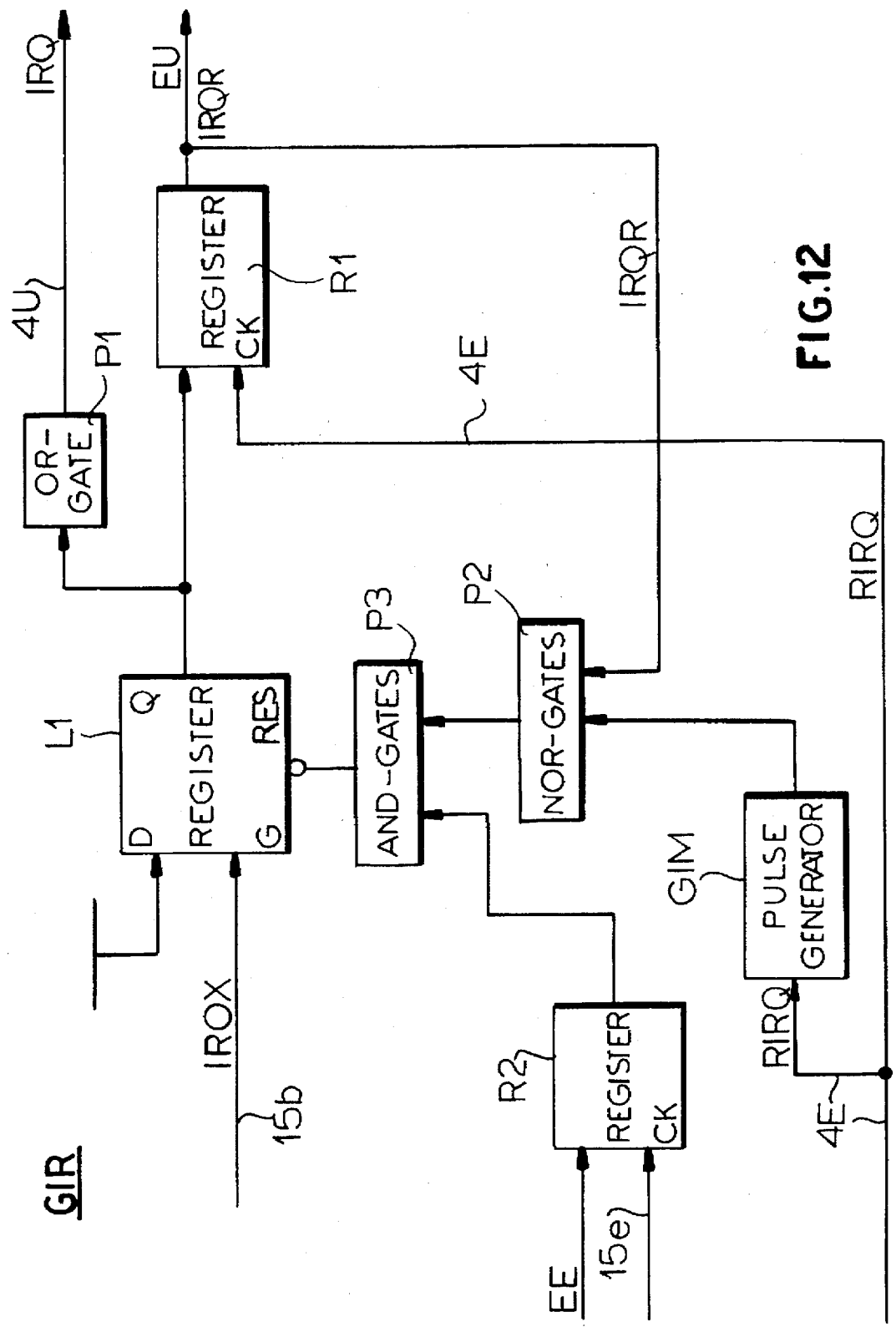

With reference to FIG. 12, in the example considered here of 16 possible interrupt requests, circuit GIR comprises a bank of 16 latch registers L1. Each element has its gate input connected to one of wires 15b and, upon receipt of request IRQX, it transfers at the output a signal at pre-set logic level (in particular 1). The outputs of the different elements of L1 are connected to the inputs of an OR gate, indicated as P1, whose output is the wire of bus 4U conveying flag IRQ, signalling the presence of an interrupt request, to controller CNT. Moreover, the outputs of L1 are each connected to one of the registers of a bank of 16 registers R1, which store interrupt requests and transfer them on bus EU (signal IRQR) upon reception of a reading command RIRQ supplied by the controller through a wire of bus 4E. Each output signal of R1 is also fed back to the reset input of the respective element in L1 through the series of an AND gate and a NOR gate, belonging to respective gate banks P2, P3. Each gate in P2 is enabled by a pulse which is derived by a pulse generator GIM from the reading command for the respective register in R1. In practice, GIM can be a differentiating circuit. The individual gates in P3 are enabled by a respective output signal of a bank of 16 enabling registers R2 which, upon command of a writing signal provided by CDE (FIG. 11) through one of the wires 15e, load a signal which enables processing of individual interrupt requests and which is supplied by the controller through bus EE. It is evident that, with the arrangement described here, an interrupt request is not reset and it is kept available to the controller until it is actually read by the latter. In this way, requests arriving while the controller is already processing another request are not lost. Moreover, through register R2 and ports P3 it is possible to mask interrupts individually.

Figure 13:
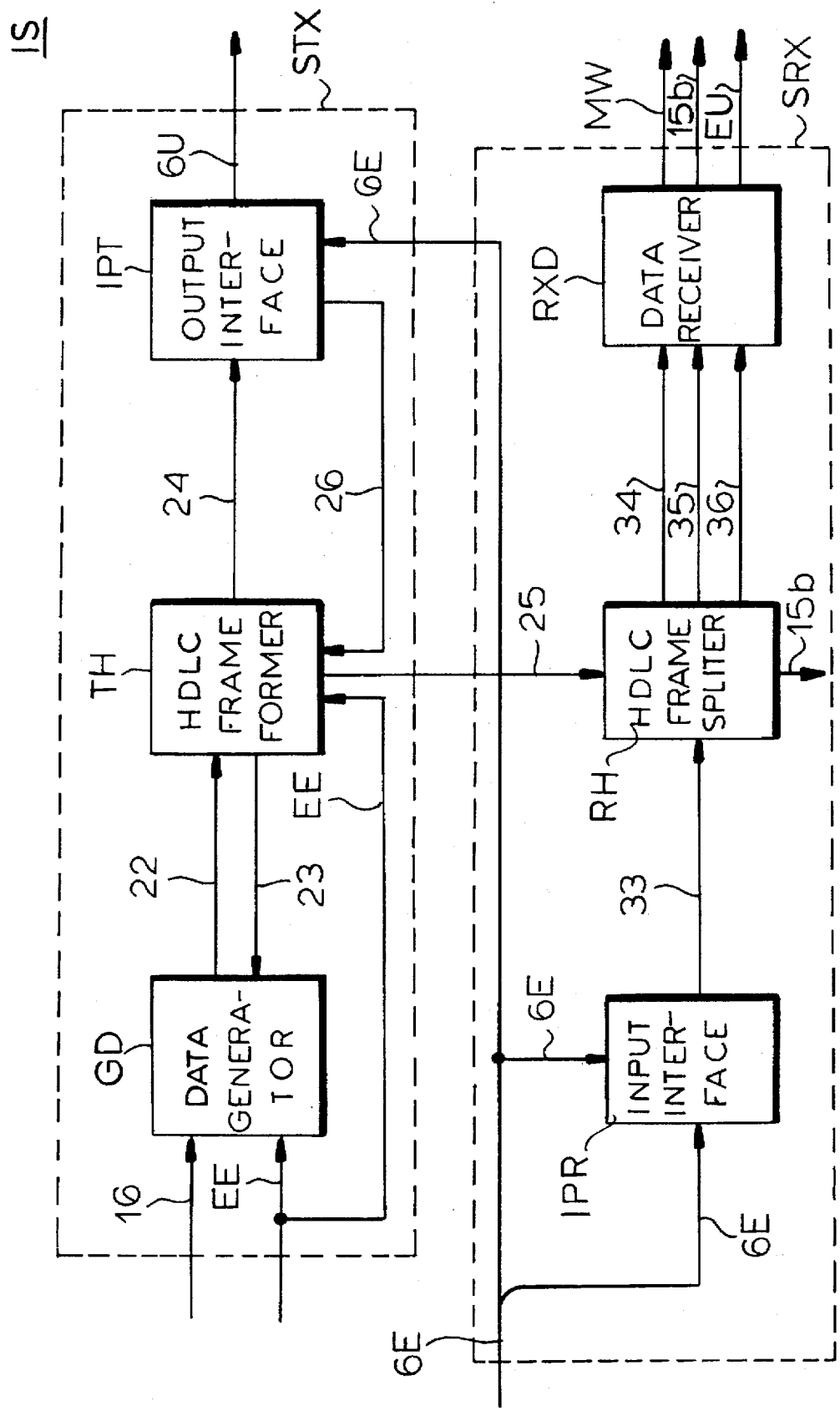

FIG. 13 shows that interface IS towards serial line 6 comprises a transmit section STX and a receive section SRX, which correspond to the set of blocks BMU, ISU and respectively ISE, BME in FIG. 4. If device DEC (FIG. 1) is utilized as a transmitter, transmit section STX is essentially to forward MPEG data and messages, while receive section SRX receives and makes available to the controller the signals acknowledging message reception, coming from the device associated to a remote decoder; conversely, in device DEC associated to the receiver, section STX transmits the acknowledge signals provided by the controller and the receive section receives data and messages, sends the former to the system buffer and makes the latter available to the controller.

The transmit section has to arrange transmission of signals in HDLC protocol within a PCM frame, by taking into account on one hand the protocol characteristics and on the other the fact that certain channels of a PCM frame are reserved to synchronism information and to signalling and cannot be used for communications. The HDLC protocol used in the present application uses "frames" including, in order:

- at least one initial synchronism word, characterized by six consecutive "1" bits; synchronism words can be multiple if this is required to adapt the channel filling to the bit rate actually required;
- an "address" word, comprising a group of bits specifying the type of information transmitted, namely MPEG data, message or acknowledge signal; in this last case, the address word also encodes the meaning of the acknowledge signal itself;
- a succession of words representing the transmission information content (these are obviously missing in case of transmission of an acknowledge signal);
- two words for checking the transmission correctness (in particular, two words representing a cyclical redundancy code).

Further detail on the frame structure indicated can be found in international standard ISO/IEC 3309.

Having taken that into account, transmit section STX comprises:

- a data generator GD, comprising two elements which store respectively data coming, for instance, from unit SD (FIG. 5) of parser PA through connection 16 and messages provided by the controller through bus E; GD forwards the data/messages, one byte at a time, to a HDLC frame forming device TH, when GD receives the corresponding request from TH; the memory element for the messages is block BMU in FIG. 4.
- HDLC frame forming device TH, which inserts the synchronism words and the address at the start of the frame, breaks up sequences of 1's which, in the information words, could simulate the synchronism word (in particular, by inserting a 0 after five consecutive 1's), and computes the cyclical redundancy code, adding it at the end of the frame; the structure of TH shall be described further, with reference to FIG. 14;
- an output interface IPT, which requests from TH, one bit at a time, the signals to be transmitted and inserts them into a PCM frame on the basis of the synchronism information provided by CIS (FIG. 1) through line 6E; the PCM frame is then emitted on connection 6U.

Figure 15:
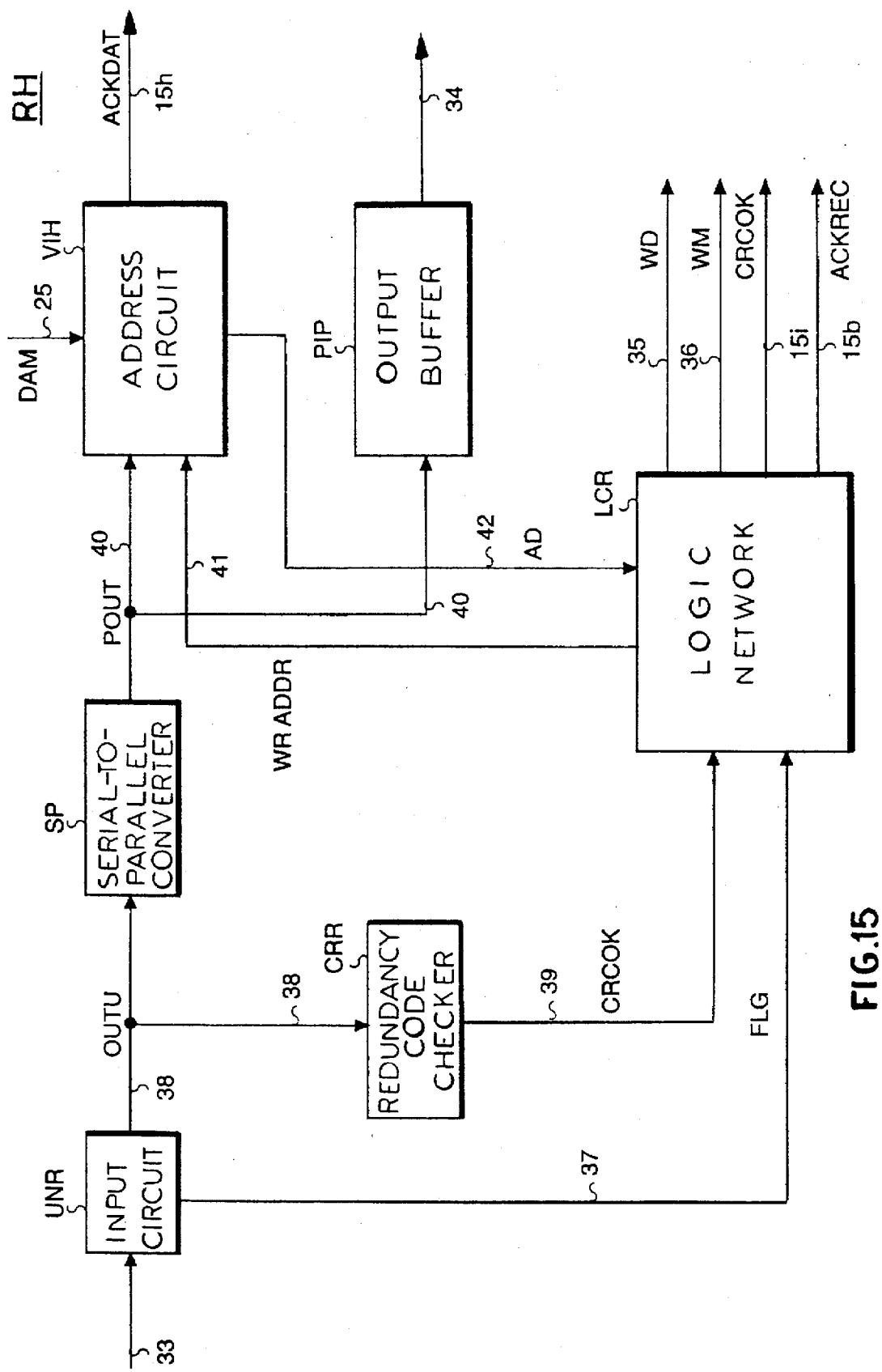

The receive section is complementary to the transmit section and comprises:

- an input interface IPR which extracts, one bit at a time, HDLC data from a PCM frame present on line 6E, on the basis of synchronism information supplied by CIS through the same line 6E;
- a device RH for splitting the HDLC frame, whose tasks are complementary to those of TH and which has to recognise the type of information transmitted, transferring MPEG data and messages, one byte at a time, to a data receiver RXD, and making available the acknowledge signals to controller CNT (FIG. 1); the structure of RH is illustrated in detail in FIG. 15; and
- data receiver RXD, which stores in data or message buffers the bytes received from RH before forwarding them respectively to BS (FIG. 4) and CNT (FIG. 1) through busses MW, EU; the data buffer is composed of two elements in a ping-pong arrangement and it is to store data for the time needed by the memory controller to obtain access to BS; the message buffer (which has been indicated as BME in FIG. 4) on the contrary is a FIFO memory, storing complete messages and signalling that it has been filled (and therefore that messages are present), by an interrupt request.

Figure 14:
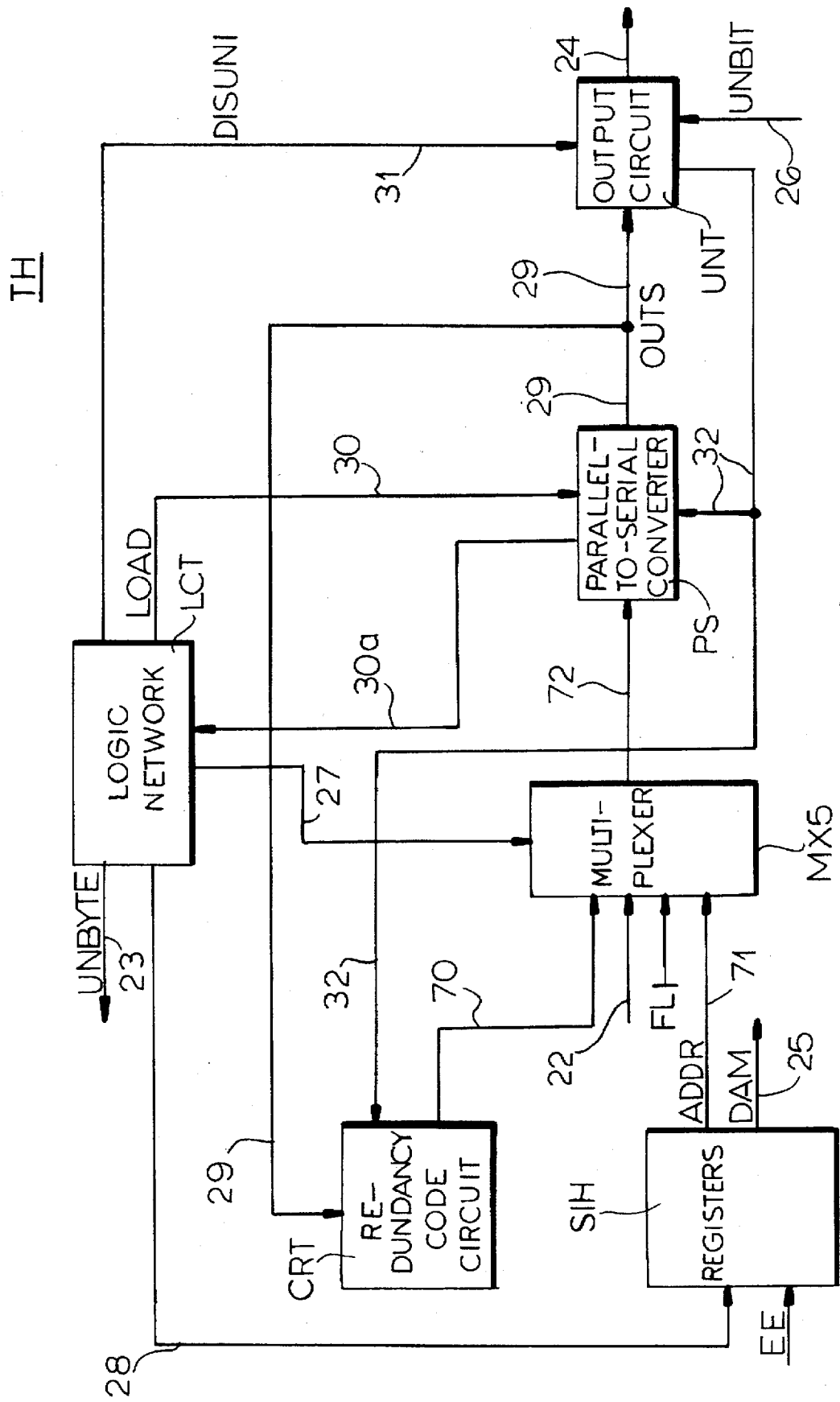

With reference to FIG. 14, in block TH a multiplexer MX5 has four inputs connected respectively: to connection 22 over which GD (FIG. 13) presents information to be transmitted; to means supplying the synchronism word (arrow FL), obtained through the appropriate group of wired logic levels; to output 70 of a circuit CRT computing the cyclical redundancy code in transmission; to output 71 of a circuit SIH for selecting the HDLC address. MX5 is positioned on the appropriate input, depending on the phase of the transmission, by a command emitted on a connection 27 by a control logic network LCT, which also requests the data bytes from generator GD, through a signal UNBYTE emitted on wire 23.

Circuit SIH comprises three registers into which the controller writes, through bus EE, the values assigned to the address word respectively for data, messages and acknowledge signals. Through connection 71, SIH provides MX5, on the basis of a control signal emitted by LCT on a connection 28, with word ADDR corresponding to the type of information transmitted. SIH also makes available the values utilized to block RH in FIG. 13 (signal DAM present on a connection 25), so that the latter can correctly interpret the information received. Obviously, such values shall also be notified to remote device DECR (FIG. 1), if present.

Output 72 of multiplexer MX5 is connected to a parallel-to-serial converter PS, whose output 29 (signal OUTS) is connected both to CRT and to a device UNT which emits the data on serial output 24 after breaking up the sequences of consecutive 1's as stated above. Circuit PS loads the bytes coming out of MX5 upon command of logic network LCT (LOAD, wire 30), to which PS signals (wire 30a) that a byte has been forwarded to UNT. The break-up of sequences of 1's is disabled by LCT (signal DISUNI present on a wire 31) when the bit string on wire 29 is related to a synchronism word. UNT also receives from IPT (FIG. 13) the bit request (signal UNBIT) through wire 26 and transfers it, through a wire 32, both to PS, as a shift command to cause the presentation in output of a new bit, and to CRT as a command to lead the bit coming out of PS so that the bit can be taken into account in the redundancy code computation. The realization of a circuit performing the functions of UNT is not a problem for the skilled in the art.

With reference to FIG. 15, in circuit RH for splitting the HDLC frames, a block UNR, whose tasks are complementary to those of block UNT (FIG. 14), receives from IPR (FIG. 13) the serial stream of signals present on a wire 33, discards the 0's which UNT may have inserted, and recognises and signals to a control logic network LCR, through a wire 37, the arrival of a synchronism word (signal FLG).

Data output 38 of UNR (signals OUTU) is connected to a serial-to-parallel converter SP and to a circuit CRR for checking the cyclical redundancy code, which circuit signals to LCR that the two words related to that code have been recognized (signal CRCOK on wire 39, which is also stored in a register of LCR to be made available to the controller, e.g. through ICP, FIG. 2, as represented schematically by wires 15i). Output 40 of SP (signals POUT) is connected to a circuit VIH for checking the HDLC address and to an output buffer memory PIP, with a capacity of two words, which makes available the words emitted by SP to data receiver RXD after storing them for a time interval equal to the duration of two words. Storing the two words is aimed at preventing the words related to the cyclical redundancy code from being sent to downstream components, as the following description will clarify. Circuit VIH is enabled by LCR to load the address, after RH has received the synchronisation word or words, through command WRADDR on wire 41, and to compare such address with signal DAM supplied by the transmitter, to recognise the type of transmission. Information on the type of transmission is communicated to LCR (signal AD on connection 42) which, in case of data or messages, must have the information contents of the transmission loaded into the appropriate memory of RXD (FIG. 13) through data write commands WD or message write commands WM generated on wires 35, 36. The emission of such commands is inhibited in the presence of synchronism words, of the address or of the cyclical redundancy code. If the transmission concerns an acknowledge signal, VIH makes it available to the controller through ICP (signal ACKDAT present on wires 15h). LCR also emits, on the appropriate wire 15b, the interrupt request ACKREC. To keep the drawing simple, the reading request signals for ACKDAT and CRCOK are not shown.

The operation of RH is as follows. The arrival of a synchronism word after a series of different words indicates to LCR the start of a HDLC frame: this means that the two words which at that moment are stored in PIP are the words of the cyclical redundancy code of the preceding frame, which must not be forwarded to downstream components, so that LCR does not emit signals WD, WM. After the first synchronism word, RH can receive other synchronism words or the HDLC address: if other synchronism words arrive, these are signalled by an equal number of signals FLG to LCR; when, in correspondence with a new word, signal FLG is no longer present, LCR issues the address loading command WRADDR: in these cases, too, the write commands are not generated. They shall be generated only after receipt of the address, with a delay of two byte times, so that the first information word is actually present at the output of PIP.

Figure 16:
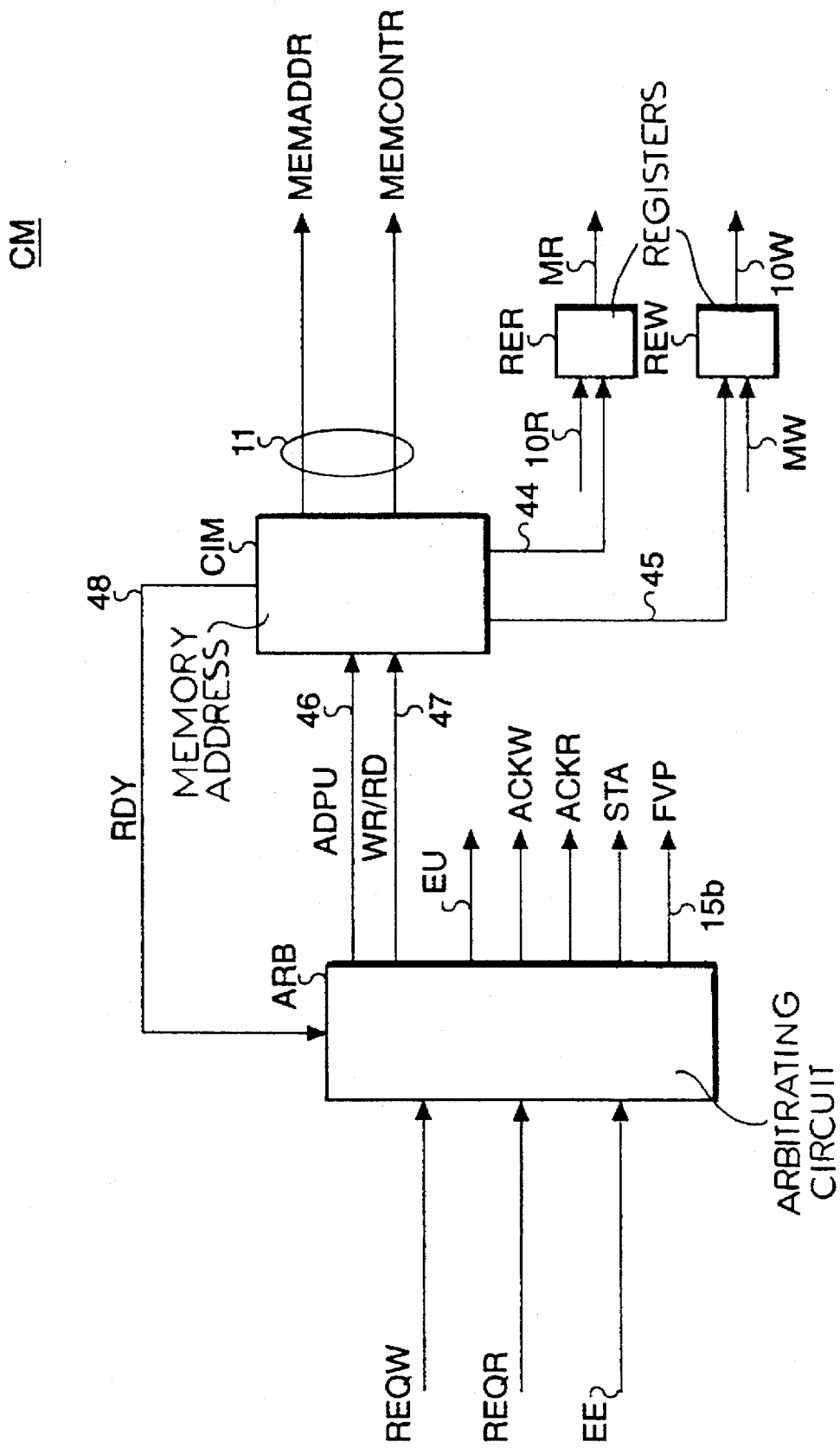

FIG. 16 shows the block diagram of memory controller CM. Controller CM has to process either access requests by the components 5 of DES (FIG. 1) to one of sections BS, BA, BV or BD (FIG. 4) for writing/reading MPEG streams to be demultiplexed or demultiplexed streams, or access requests by controller CNT (FIG. 1) to any memory position. In the example shown, it is assumed that CM can therefore receive five distinct writing requests and five distinct reading requests: four of the reading/writing requests come from components of DES and regard only one section among BS, BA, BV or BD (in particular ISCE, ITE, ISE, IBE, FIG. 4, can write into BS; ISCU, ITU, ISU, IBU can read from BS; PA can read from BS and write into BA, BV, BD; IU can read from BA, BV); the other reading/writing request is the one supplied by CNT and, for the purposes of this request memory MT (FIG. 1) is seen as a single unit. A different pointer shall correspond to each of the five reading/writing requests: pointers for operations required by components of DES select the address in the group corresponding to the particular section and will allow a FIFO management of the sections; the pointer for access by CNT instead points to the address communicated by CNT.

This said, block CM comprises:

an arbitrating circuit ARB which receives the memory writing/reading requests and selects the corresponding pointer (signal ADPU and write/read signals WR/RD). Note that requests coming from DES (FIG. 2) arrive through MW and those coming from the controller arrive through wires of connection 15: for the sake of simplicity, no distinction is made between the different request sources and the requests are indicated overall as REQW, REQR respectively for writing and reading. ARB also checks the filling condition of the individual sections, generating a certain number of signals about that condition, which will be examined in connection with FIG. 17, which provides a detailed illustration of the structure of ARB. Some of these signals, indicated overall as STA, are utilised outside ARB;

a circuit CIM which controls memory addressing and which, on the basis of the information supplied by ARB, identifies the section involved and generates on connection 11 the read or write command (MEMCONTR) and the addresses (MEMADDR) with the procedures required by the protocols for managing a Dynamic RAM memory; these procedures are thoroughly conventional and therefore it is not necessary to describe CIM in detail; and a pair of registers RER, REW for temporary storage of data read from the memory (which arrive through connection 10R, belonging to connection 10 in FIG. 2, and which must be transferred on MR) or respectively of data to be written into the memory (which arrive through MW and must be transferred on connection 10W, also part of connection 10 in FIG. 2); the data are loaded into RER, REW upon a command from CIM (wires 44, 45).

At the end of each operation, CIM supplies ARB with an operation end signal RDY (wire 48) and ARB in turn will be able to send to the requesting component acknowledge signals ACKR, ACKW that reading or writing has occurred, through the wires of bus MR or of connection 15 (request by DES or respectively by CNT, FIG. 1). In this case too, no distinction is made between acknowledge signals directed to DES or to the controller.

Figure 17:
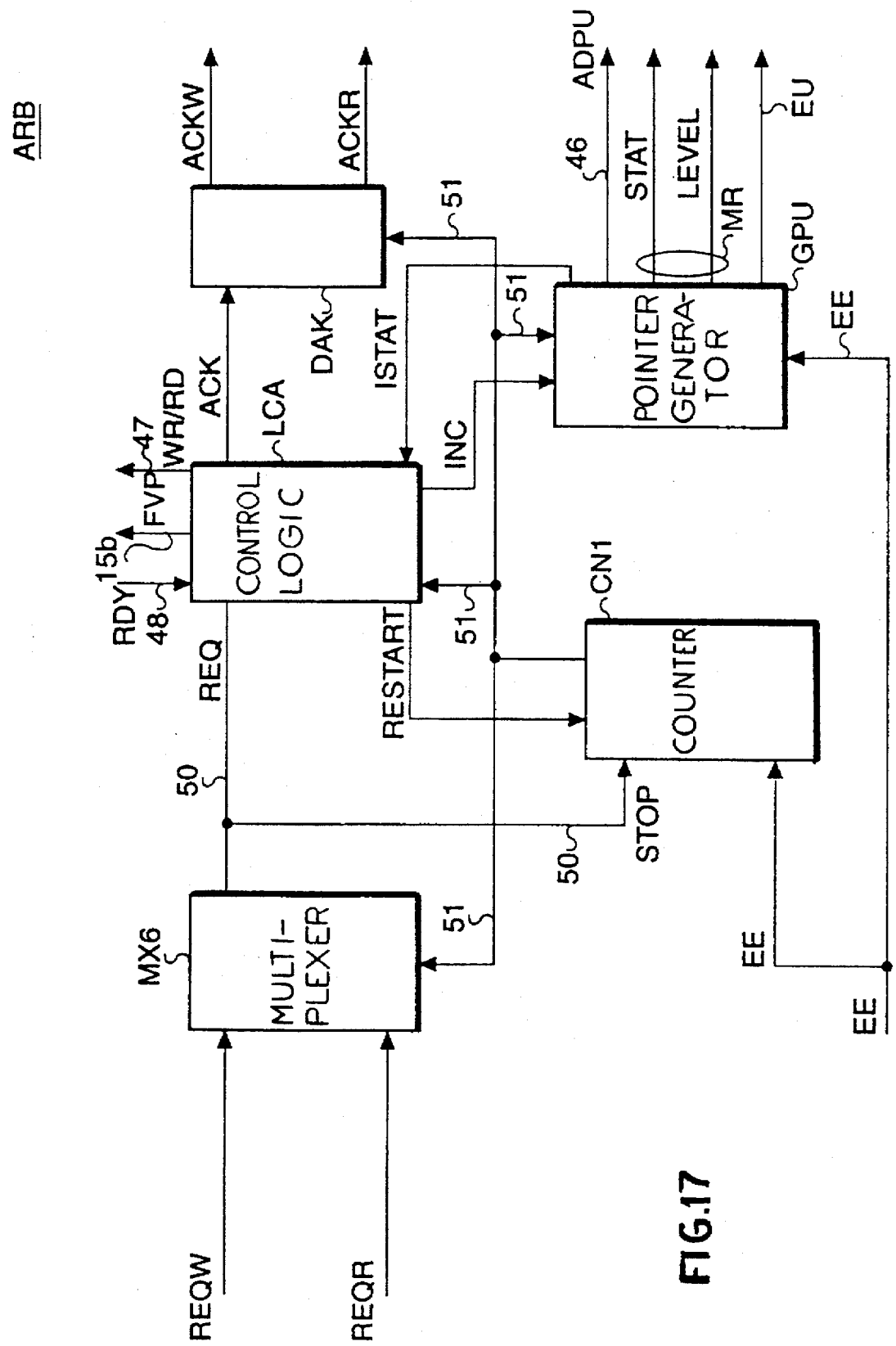

With reference to FIG. 17, circuit ARB comprises:

a ten-input multiplexer MX6, which receives the ten possible requests REQW, REQR for access to the memory and forwards a request at a time on an output 50, upon command of a counter CN1;

a circuit GPU to generate the ten read/write pointers;

a circuit DAK to generate acknowledge signals ACKR, ACKW;

a control logic network LCA.

Counter CN1 is a counter that normally carries out a cyclical count to command sequentially the connection of the ten inputs of MX6 to output 50, thereby allowing sequential processing of the access requests, e.g. following the technique commonly known as round robin. Conveniently, the inputs of MX6 are arranged in such a way that there is an association between reading/writing requests and even/odd count values of CN1: e.g. even values can select the inputs carrying reading requests REQR and the odd ones can select the inputs carrying writing requests REQW. CN1 can however also be programmed by the controller in such a way as to connect only pre-set inputs of MX6 to the output. Request REQ transferred to the output of MX6 is supplied both to control logic network LCA for being processed and to CN1 as a command for temporarily stopping (signal STOP) the sequential count, which will be resumed upon command from LCA (signal RESTART) once the request has been served.

The count value present on output 51 of CN1 is also supplied to pointer generating circuit GPU, to control logic network LCA and to acknowledge generating circuit DAK.

Circuit GPU, on the basis of the value present on connection 51 and of the address supplied by CNT (FIG. 1) through bus EE (in case of request coming from CNT), sends signal ADPU to CIM (FIG. 16) to address the pointer involved. The writing address issued by GPU is always the address of the first free position, while the reading address is always that of the first occupied position. After each operation, GPU increases the pointer upon command of a signal INC supplied by LCA. Clearly, in case of operation requested by CNT, increasing a pointer has no effect if the previously carried out operation involved only one cell and CNT has, in the meantime, loaded a new address into GPU through EE. The procedures for handling memory pointers, described above, are well known in the art.

GPU also carries out a comparison between the reading pointer and the writing pointer to measure how full the memory is and generates three signals indicating the result of the comparison. A first signal is signal STAT which indicates whether the filling level is between a lower and an upper threshold or whether it has exceeded the upper threshold as an effect of a writing operation or it has dropped below the lower threshold as a result of a reading operation: as has been stated above, this signal is supplied to block ITU (FIG. 19) to generate the requests for suspension or resumption of data dispatching; the threshold values are programmable and they are supplied to GPU by controller CNT, through bus EE. A second signal (ISTAT) indicates instead the condition of full or empty memory and it is supplied to control logic network LCA which, on the basis of the value of this signal and of the type of operation requested (which, with the hypothesis made on the count values of CN1, is signalled by the least significant bit of the value present on connection 51), decides whether to perform the operation, and therefore to generate the respective command towards CIM and then to send the acknowledge that the operation has taken place, or to send an interrupt request FVP towards ICP (FIG. 2). A third signal (LEVEL) represents the difference between reading and writing pointers in the system buffer and it is supplied, again through wires of bus MR, to FD (FIG. 2) which uses it to generate signal CKESTR: signal LEVEL can be a 4 bit signal, which, in the example considered, in which BS (FIG. 4) has a 16 bytes capacity, corresponds to examining the filling level of the memory in 1 byte steps. Signals STATS and LEVEL are the signals indicated as a whole by STA in FIG. 16. The various signals generated by GPU are also kept available to controller CNT, which can request them to be presented on bus EU. Realising a circuit carrying out the functions described above presents no problem to the skilled in the art.

Acknowledge signal generating circuit DAK is a simple decoder which receives a signal ACK acknowledging the completion of an operation by LCA and, depending on the value present on connection 51, generates one of five possible write acknowledge signals ACKW, or five read acknowledge signals ACKR. The signal generated is sent to the component which requested the operation in the memory.

Control logic network LCA is a conventional finite state machine, whose operations are inferred from the description above. For the sake of clarity, such operations are summarized here: LCA, receiving a signal REQ and the count value of CN1, which specifies whether the request concerns a writing/reading in the system, audio, video or user buffers, or a writing/reading requested by CNT and therefore regarding the memory as a whole, checks the memory condition to see whether the operation can be performed: in the negative, LCA emits the interrupt signal FVP on a wire 15b and, in the affirmative, it generates the writing/reading command WR/RD on wire 47, emits the acknowledge signal ACK and the pointer increment signal INC and, at the end of the acknowledge signal, send signal RESTART to CN1. Designing a logic network carrying out these of operations is not a problem for the skilled in the art.

Figure 18:
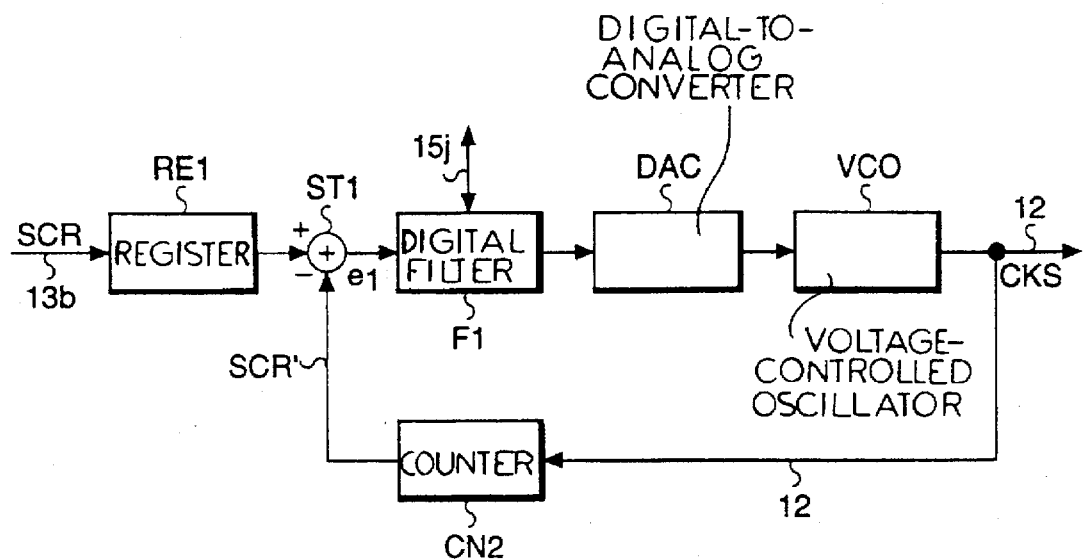

FIG. 18 shows that the circuit generating CKS comprises:

- a register RE1 which loads the value of time stamp SCR taken from the MPEG pack and supplied by PA (FIG. 2) through wires 13b of connection 13;

- a subtractor ST1, which carries out the subtraction between the value of SCR received from RE1 and a local value SCR' of SCR, supplied by a counter CN2 controlled by signal CKS, and generates an error signal $e_1$;

- a digital filter F1, which performs low-pass filtering of the error signal $e_1$; filter F1 is a filter of which the zeroes, the poles and the gain can be programmed by the controller via interface ICP (FIG. 2); connection 15j schematizes the link between F1 and ICP necessary for the addressing, the loading of the programmed values, the exchange of dialogue protocol signals;

- a digital-to-analog converter DAC, which receives the filtered error signal and converts it into analog form to regulate the frequency of a voltage-controlled oscillator VCO, of which the output 12 conveys reconstructed signal CKS at 90 kHz.

Note that, for a correct circuit operation, filter F1 shall be initialised so that the first local value SCR' of SCR corresponds to the value loaded in RE1.

Figure 19:
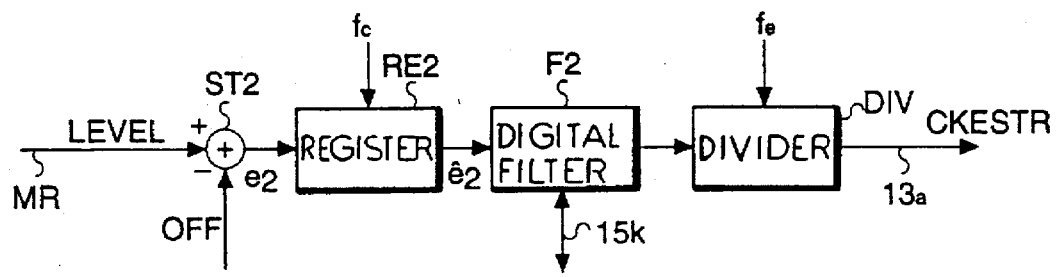

With reference to FIG. 19, the circuit for generating CKESTR comprises:

- a subtractor ST2, which receives from the memory controller, through bus MR, the signal LEVEL representing the difference between reading and writing pointers and introduces on that difference a fixed offset OFF, for instance such that the equilibrium condition, which does not require a correction of the CKESTR frequency, corresponds to the situation of half-full memory: in the example considered, in which the filling level is evaluated in a sixteen-value scale, OFF will have value 8;

- a sampling register RE2, which samples the output signal of ST2, representing an error signal $e_2$, with frequency $f_c$ (e.g. 8 kHz or 1 kHz) much lower than the frequency of variation of the signal LEVEL; the command for loading signal $e_2$ into RE2 is supplied by the decoder time base (not represented);

- a digital filter F2, which carries out a low-pass filtering of signal $e_2$; also F2 is programmable by the controller, exactly alike F1 (FIG. 18); connection 15k, having the same purposes as connection 15j schematizes the link between F2 and ICP (FIG. 2);

- a divider DIV, which divides a fixed-frequency signal (in particular a 23 MHz signal) $f_e$, generated by the time base of decoder DEC, by the signal coming out of filter F2 and generates signal CKESTR, which is sent to PA through wires 13a of connection 13.

Note that it is also possible to program the above described circuit so as to utilize a fixed value of CKESTR, obtained by setting a fixed division factor in DIV.

It is evident that what has been described is given solely by way of non-limiting example, and that variations and modifications are possible without departing from the scope of the invention.

We claim:

1. A device for transmitting, receiving and decoding MPEG audio-visual streams organized in accordance with standard ISO/IEC 11172 and resulting from the multiplexing of coded audio and video streams as well as of user-depending private data streams, the device comprising demultiplexing and synchronization means (DES) for demultiplexing the MPEG streams into the constituent audio, video and private data streams and for extracting synchronization information from the MPEG streams, means (DA, DV) for decoding audio and video streams, and means (UA, UV) for the presentation of audio and video signals in analog form, said device having a controller (CNT) controlling and supervising the demultiplexing and decoding operations, said device being realized as a board embodying the demultiplexing and synchronization means (DES), which are a unit distinct from the controller (CNT), and comprises first interface means (CSC) for connection to a local storage device (MEL) which constitutes a local source or a local receiver of said MPEG streams, and second interface means (IA, CIS) for connection to a telecommunications network (2, 3) through which the device receives said MPEG streams from remote sources or transmits them to remote receivers, said device further comprising temporary storage means (MT), functionally subdivided into four sections (BS, BA, BY, BD), a first of said sections serving for memorization of MPEG streams to be demultiplexed and decoded and the other three sections serving, for memorization of the demultiplexed audio, video and data streams, respectively.

2. The device claimed in claim 1 wherein said board is a board of a personal computer which realizes said controller (CNT) and which is also entrusted with programming the interface means (DES), the decoding means (DA, DV) and the presentation means (UA, UV).

3. The device claimed in claim 1 wherein said board also incorporates the controller (CNT), to realize a pre-programmed autonomous decoding device.

4. A device for transmitting, receiving and decoding MPEG audio-visual streams organized in accordance with standard ISO/IEC 11172 and resulting from the multiplexing of coded audio and video streams as well as of user-depending private data streams, the device comprising demultiplexing and synchronization means (DES) for demultiplexing the MPEG streams into the constituent audio, video and private data streams and for extracting synchronization information from the MPEG streams, means (DA, DV) for decoding audio and video streams, and means (UA, UV) for the presentation of audio and video signals in analog form, said device having a controller (CNT) controlling and supervising the demultiplexing and decoding operations, said device being realized as a board embodying the demultiplexing and synchronization means (DES), which are a unit distinct from the controller (CNT), and comprises first interface means (CSC) for connection to a local storage device (MEL) which constitutes a local source or a local receiver of said MPEG streams, and second interface means (IA, CIS) for connection to a telecommunications network (2, 3) through which the device receives said MPEG streams from remote sources or transmits them to remote receivers, the second interface means (IA, CIS) comprising means (IA) for connection to a first serial line (2), intended for asynchronous transmission of MPEG streams, and means (CIS) for connection to a second serial line (3) intended for synchronous transmission of MPEG streams, data and commands defined as messages which cannot be inserted in the MPEG streams and which are directed to the controller (CNT), and signals acknowledging that a message has been received or an operation has been carried out.

5. The device claimed in claim 4 which comprises an input bus (E) to which the first interface means (CSC), the means (IA) for connection to the first serial line (2), the controller (CNT) and the demultiplexing and synchronization means (DES) are connected, and which allows: transfer of MPEG streams from the first interface means (CSC) and from the means (IA) for connection to the first serial line (2) to the demultiplexing and synchronization means (DES) and vice versa; forwarding the private data extracted from the MPEG streams to the controller (CNT) and vice versa; access of the controller (CNT) to the first and the second interface means (CSC, IA, CIS) and to the demultiplexing and synchronization means (DES) to write programming information and read information on the operation of the device.

6. The device claimed in claim 5 which comprises an output bus (U) to which the demultiplexing and synchronization means (DES), the means (DA, DV) for decoding audio and video streams and the controller (CNT) are connected and which allows the transfer from the demultiplexing and synchronization means (DES) to the decoding means (DA, DV) of the demultiplexed audio and video streams, and the access by the controller (CNT) to the decoding and presentation means (DA, DV, UA, UV) for their programming.

7. The device claimed in claim 6 wherein the means (CIS) for connection to the second serial line (3) are connected directly to the demultiplexing and synchronization means (DES) through a third serial line (6).

8. A device for transmitting, receiving and decoding MPEG audio-visual streams organized in accordance with standard ISO/IEC 11172 and resulting from the multiplexing of coded audio and video streams as well as of user-depending private data streams, the device comprising demultiplexing and synchronization means (DES) for demultiplexing the MPEG streams into the constituent audio, video and private data streams and for extracting synchronization information from the MPEG streams, means (DA, DV) for decoding audio and video streams, and means (UA, UV) for the presentation of audio and video signals in analog form, said device having a controller (CNT) controlling and supervising the demultiplexing and decoding operations, being realized as a board embodying the demultiplexing and synchronization means (DES), which are a unit distinct from the controller (CNT), and comprises first interface means (CSC) for connection to a local storage device (MEL) which constitutes a local source or a local receiver of said MPEG streams, and second interface means (IA, CIS) for connection to a telecommunications network (2, 3) through which the device receives said MPEG streams from remote sources or transmits them to remote receivers, wherein the demultiplexing and synchronization means (DES) comprise:

third interface means (DM) for transferring from the input bus (E) to the temporary storage means (MT) and vice versa, with a direct memory access technique, MPEG streams coming from or directed to the first interface means (CSC), the means (IA) for connection to the first serial line (2) or the controller (CNT);

fourth interface means (IU) for transferring demultiplexed audio and video Streams from the temporary storage means (MT) to the output bus (U);

fifth interface means (IS) for managing the signal exchange, through the third serial line (6), between the means (CIS) for connection to the second serial line (3) and the demultiplexing and synchronization means (DES);

a parser (PA), which receives the MPEG streams from the temporary storage means (MT), demultiplexes them and extracts therefrom synchronization information, comprising at least information (SCR) representative of a base frequency for the local reconstruction of a clock signal at that base frequency;

control means (CM) for the temporary storage means (MT);

sixth interface means (ICP) for information exchange with the controller (CNT), which means make information on the device operation available to the controller, supply commands to the other circuits of the demultiplexing and synchronization means (DES) and have arbitration tasks to prevent conflicts for the access to the input bus (E) by the demultiplexing and synchronization means (DES) or by the controller (CNT); and synchronization means (FD) for the local reconstruction of the base frequency clock signal and for generating a timing signal (CKESTR) which determines the reading frequency by the parser (PA) in the first section (BS) of the temporary storage means (MT).

9. The device claimed in claim 8 wherein said parser (PA) comprises:

a receiving unit (IRD) for receiving data from the first section (BS) of the temporary storage means, which unit requests the data with a frequency determined by said timing signal (CKESTR);

means (SD), connected to an output of the receiving unit (IRD), for transferring, to the fifth interface means (IS) information to be forwarded to the second serial line (2);

first decoding means (D1, D2, D3) also connected to the output of the receiving unit (IRP) for: recognizing and decoding codes representative of service information inserted in the MPEG streams in order to allow their demultiplexing; communicating information extracted from said codes to a control unit (CPA0 or to a parameter memory (MP), depending on the type of information; extracting and sending to the synchronization means (FD) said information (SCR) representative of a base frequency;

second decoding means (D4) for: recognizing and separating packets relevant to the video, audio and private data streams multiplexed in the MPEG streams; supplying the packets to respective output ports (POA, POV, POD) for subsequent forwarding respectively to the second, third and fourth section (BA, BY, BD) of the temporary storage means (MT); and supplying service information extracted from a header of each packet to the parameter memory (MP), the first and second decoding means (D1, D2, D3, D4) also communicating anomalous situations detected to said control unit (CPA);

said parameter memory (MP), which is also accessible by the controller (CNT) to write programming information and reading information extracted from the MPEG streams, and which controls the second decoding means (D4) so as to enable the extraction of a sequence of packets relevant to one or more predetermined streams of the different types; and said control unit (CPA), which is arranged to start the operations of the parser (PA) when receiving a start signal from the controller (CNT), and to enable, on the basis of the information recognized by the first decoding means themselves and of the information contained in the parameter memory (MP), either units (D2, D3) belonging to the first decoding means and intended to recognize specific codes, or the second decoding means (D3).

10. The device claimed in claim 9, wherein said parser (PA) also comprises means (MX3, MX4), controlled by said control unit (CPA) and connected between the output of the receiving means (IRD) and the output ports (POA, POV) for the audio and video streams, for transferring the packets of a MPEG stream directly from the receiving means (IRD) to one of such output ports, so that such packets bypass the second decoding means (D4).

11. The device claimed in claim 8, said device further comprising temporary storage means (MT), functionally subdivided into four sections (BS, BA, BY, BD), a first of said sections serving for memorization of MPEG streams to be demultiplexed and decoded and the other three sections serving, for memorization of the demultiplexed audio, video and data streams, respectively, said temporary storage means (MT) being formed with a dynamic random access memory, and wherein said control means (CM) are able to serve access requests, coming from the demultiplexing and synchronization means (DES), for writing MPEG streams to be demultiplexed or reading demultiplexed audio, video and data streams into or respectively from one of the sections (BS, BA, BY, BD) of the temporary storage means (MT), and access requests coming from the controller (CNT) for writing/reading information relevant to the device programming or operation into/from any position of the temporary storage means (MT), and comprises:

an arbitrating circuit (ARB), which is arranged to: receive the requests for writing into or reading from the memory; generate signals (ADPU) to select a writing/reading pointer relevant to one of the sections (BS, BA, BY, BD), or a writing/reading pointer relevant to the whole memory and signals (WR, RD) to command writing/reading; generate signals (ACKW,ACKR) acknowledging that the operation has been carried out, to be sent to the requesting unit; and check the filling condition of the individual sections (BS, BA, BY, BD), generating signals relevant to such condition;

a circuit (CIM) for controlling addressing of the temporary storage means (MT), which circuit identified, on the basis of said selection signals generated by the arbitrating circuit (ARB), a section or position concerned in the temporary storage means (MT) and generates writing/reading commands and addresses, sending them to the temporary storage means (MT); and a pair of registers (RER, REW), controlled by the addressing controlling circuit (CM), for temporary storage of the data read from and respectively to be written into the temporary storage means (MT).

12. The device claimed in claim 11 wherein the arbitrating circuit (ARB) of the means (CM) for controlling the memory comprises:

means (MX6, CN1) for selecting a writing/reading request to be served, which means comprise a multiplexer (MX6) at whose inputs all possible requests arrive and a counter (CN1) of which the count value constitutes a command signal for setting the multiplexer (MX6), and which is stopped each time a writing/reading request is transferred to the output of the multiplexer (MX6), the count value of the counter (CN1) also containing information on the type of memory operation to be performed;

a control logic network (LCA), which is arranged to: receive from the multiplexer (MX6) the request selected and from the counter (CN1) the corresponding count value; check the memory condition to see whether the operation can be carried out; generate, if the operation can be carried out, a writing/reading command, a command of emission of the signal acknowledging that the operation has been completed, a command for incrementing the pointer involved in the operation, and a signal for restarting the count of the counter (CN1); and generate, if the operation cannot be carried out, an interrupt signal for the controller (CNT);

an address generation circuit (GPU), which is arranged to present at the output, in correspondence of a request and on the basis of the value of the count of the counter (CN1) or of an address supplied by the controller (CNT) and of the increment signal supplied by the control logic network (LCA), the address of the first position available for writing or of the first position containing data to be read in the section involved in the temporary storage means (MT), to carry out a comparison between the reading and the writing pointers of a same section to determine the filling level and to generate, as a consequence: a first status signal (STAT), which indicates whether the filling level lies between an upper and a lower threshold or has exceeded the upper threshold as an effect of a writing or has dropped below the lower threshold as an effect of a reading, and which is forwarded to the third interface means (DM) in order to cause the suspension or the resumption of data forwarding to the temporary storage means (MT); a second status signal (ISTAT) which indicates a full or empty condition of a section of the temporary storage means (MT) and is forwarded to said control logic network (LCA) to allow the decision on whether or not to carry out an operation; and a third status signal (LEVEL) which represents the difference between the reading and writing pointers in the first section (BS) of the temporary storage means (MT) and is forwarded to the synchronisation means (FD); and a circuit (DAK) generating acknowledge signals, which generates such signals upon command from the control logic network (LCA) and on the basis of the count value of the counter (CN1), corresponding to the request being served.

13. The device claimed in claim 12 wherein said synchronization means (FD) comprise:

a circuit for reconstructing and checking the base frequency clock signal, which circuit comprises a voltage-controlled oscillator (VCO) which is controlled by a signal obtained by filtering in a first digital low pass filter (F1) and converting into analog form a signal representing the difference between an instant output signal of the oscillator (VCO) and the nominal value of said base frequency, extracted from the MPEG streams; and a circuit for generating said timing signal, the circuit comprising a second low pass digital filter (F2) arranged to filter, with a pre-set periodicity, the third status signal (LEVEL) and to supply the filtered signal to a digital divider (DIV), which generates the timing signal by dividing a fixed frequency by the filtered value and supplies such signal to the parser (PA).

14. The device claimed in claim 13 wherein said first and digital filters (F1, F2) are programmable by the controller (CNT).

15. The device claimed in claim 8 wherein the fifth interface means (IS) comprise means (TH, IPT) for inserting data, messages and acknowledge signals to be forwarded to the second serial line (2) into frames organised according to a HDLC protocol and to insert the HDLC frames into a PCM frame, and means (IPR, RH) for extracting frames arranged according to a HDLC protocol from a PCM frame coming from the second serial line (2), for extracting data, messages and acknowledge signals from the HDLC frames, and for transferring the data to the temporary storage means (MT) and making messages and acknowledge signals available to the controller (CNT).

16. The device claimed in claim 8 wherein said sixth means (ICP) comprise a circuit (GIR) for managing interrupt requests, comprising:

recognition means (L1), comprising a plurality of elements associated each with a type of interrupt request, for recognising the arrival of the requests and keep them available until they have been served;

gate means (P1), connected at the output of all elements in said recognition means (L1), for signalling request arrivals to the controller (CNT);

storage means (R1) for storing the interrupt requests and comprising a plurality of elements, each element being connected to the output of an element of the recognition means (L1) and being arranged to transfer the respective request to the controller (CNT) when it receives a read command from said controller;

reset means (P2, P3) inserted between the output of each element of the storage means (R1) and a reset input of each element of the recognition means (L1), for resetting the respective request after the arrival of the read command; and enabling means (R2), connected to the reset means (P2, P3), for enabling the forwarding of a request towards the controller (CNT) by the recognition means (L1) only in the presence of an enabling signal supplied by the controller itself.

* * * * *